(12) United States Patent
Wang et al.

(10) Patent No.: US 9,439,185 B2
(45) Date of Patent: Sep. 6, 2016

(54) SYSTEMS AND METHODS FOR IDENTIFYING A RADIO ACCESS TECHNOLOGY

(71) Applicant: QUALCOMM Incorporated, San Diego, CA (US)

(72) Inventors: Jibing Wang, San Diego, CA (US); Joel Benjamin Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 14/260,005

(22) Filed: Apr. 23, 2014

(65) Prior Publication Data

US 2015/0103758 A1    Apr. 16, 2015

Related U.S. Application Data

(60) Provisional application No. 61/890,115, filed on Oct. 11, 2013.

(51) Int. Cl.
| | |
|---|---|
| H04W 72/04 | (2009.01) |
| H04W 48/16 | (2009.01) |
| H04W 88/06 | (2009.01) |
| H04W 36/00 | (2009.01) |
| H04W 48/18 | (2009.01) |
| H04W 72/12 | (2009.01) |
| H04W 36/14 | (2009.01) |

(52) U.S. Cl.
CPC ....... *H04W 72/0426* (2013.01); *H04W 36/005* (2013.01); *H04W 36/14* (2013.01); *H04W 48/16* (2013.01); *H04W 48/18* (2013.01); *H04W 72/1215* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,351,381 B1 | 1/2013 | Pawar et al. | |
| 2003/0083095 A1* | 5/2003 | Liang | H04W 72/1215 455/552.1 |
| 2004/0018846 A1* | 1/2004 | Cheng | H04L 1/0023 455/458 |
| 2005/0215284 A1* | 9/2005 | Su | H04W 72/1215 455/556.2 |
| 2006/0230151 A1* | 10/2006 | Kim | H04W 36/005 709/226 |

(Continued)

FOREIGN PATENT DOCUMENTS

EP    1467584 A1    10/2004

OTHER PUBLICATIONS

International Search Report and Written Opinion—PCT/US2014/054118—ISA/EPO—Dec. 11, 2014.

*Primary Examiner* — Christopher Crutchfield
(74) *Attorney, Agent, or Firm* — Austin Rapp & Hardman

(57) ABSTRACT

A method for identifying a radio access technology by an electronic device is described. The method includes generating, by a first communication circuitry, a first message that identifies a radio access technology. The first message is of a first message type. The method also includes sending, by the first communication circuitry, the first message to a second communication circuitry. The first communication circuitry and the second communication circuitry communicate with each other over a non-radio link. The method further includes sending, by the first communication circuitry, a second message associated with the first message. The second message is of a second message type that is different from the first message type.

30 Claims, 10 Drawing Sheets

(56) References Cited

U.S. PATENT DOCUMENTS

| | | | |
|---|---|---|---|
| 2006/0292987 A1* | 12/2006 | Ophir | H04W 72/1215 455/41.2 |
| 2007/0291792 A1* | 12/2007 | Watfa | H04L 1/188 370/469 |
| 2009/0081962 A1* | 3/2009 | Sohrabi | H04W 72/1242 455/79 |
| 2012/0072520 A1 | 3/2012 | Radulescu et al. | |
| 2012/0178485 A1 | 7/2012 | Zeira et al. | |
| 2012/0236735 A1* | 9/2012 | Nory | H04W 52/365 370/252 |
| 2013/0110942 A1 | 5/2013 | Shen et al. | |
| 2013/0196654 A1 | 8/2013 | Wietfeldt | |
| 2013/0208587 A1 | 8/2013 | Bala et al. | |

\* cited by examiner

FIG. 6

| Second Type Message A 616a (RAT A) | First Type Message A 610a (RAT ID A) | Second Type Message B 616b (RAT B) | First Type Message B 610b (RAT ID B) | Second Type Message C 616c (RAT A) | First Type Message C 610c (RAT ID A) | Second Type Message D 616d (RAT B) | First Type Message D 610d (RAT ID B) |

Time 632

FIG. 7

| Type0 Message A 716a (RAT 0) | Type1 Message A 710a (RAT_ID=0) | Type0 Message B 716b (RAT 1) | Type1 Message B 710b (RAT_ID=1) | Type0 Message C 716c (RAT 0) | Type1 Message C 710c (RAT_ID=0) | Type0 Message D 716d (RAT 1) | Type1 Message D 710d (RAT_ID=1) |

Time 732

| First Type Message A 810a (RAT ID A) | Second Type Message A 816a (RAT A) | First Type Message B 810b (RAT ID A) | Second Type Message B 816b (RAT A) | First Type Message C 810c (RAT ID B) | Second Type Message C 816c (RAT B) | First Type Message D 810d (RAT ID B) | Second Type Message D 816d (RAT B) |

Time 832

FIG. 8

| Type1 Message A 910a (RAT_ID=0) | Type0 Message A 916a (RAT 0) | Type1 Message B 910b (RAT_ID=0) | Type0 Message B 916b (RAT 0) | Type1 Message C 910c (RAT_ID=1) | Type0 Message C 916c (RAT 1) | Type1 Message D 910d (RAT_ID=1) | Type0 Message D 916d (RAT 1) |

Time 932

FIG. 9

SYSTEMS AND METHODS FOR IDENTIFYING A RADIO ACCESS TECHNOLOGY

RELATED APPLICATIONS

This application is related to and claims priority to U.S. Provisional Patent Application Ser. No. 61/890,115 filed Oct. 11, 2013, for "SYSTEMS AND METHODS FOR IDENTIFYING A RADIO ACCESS TECHNOLOGY."

TECHNICAL FIELD

The present disclosure relates generally to electronic devices. More specifically, the present disclosure relates to systems and methods for identifying a radio access technology.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices communicate wirelessly with other electronic devices. For example, smartphones may transmit wireless signals to other devices and/or may receive wireless signals from other devices. Some electronic devices are capable of communicating wirelessly with multiple kinds of other devices.

In some cases, wireless signals may interfere with the transmission and/or reception of other wireless signals. For example, wireless signals operating in similar frequency bands and/or at approximately the same time may degrade transmission and/or reception. As can be observed from this discussion, systems and methods that help to avoid and/or reduce interference may be beneficial.

SUMMARY

A method for identifying a radio access technology by an electronic device is described. The method includes generating, by a first communication circuitry, a first message that identifies a radio access technology. The first message is of a first message type. The method also includes sending, by the first communication circuitry, the first message to a second communication circuitry. The first communication circuitry and the second communication circuitry communicate with each other over a non-radio link. The method further includes sending, by the first communication circuitry, a second message associated with the first message. The second message is of a second message type that is different from the first message type.

The second message may be sent after the first message. The method may include sending at least one additional message associated with the first message. The at least one additional message may be of a type that is different from the first message type.

The method may include sending at least one additional message of the first message type. Each of the first message and the at least one additional message may identify separate radio access technologies.

The first message may be sent after the second message. The first message type may be masked to avoid indicating send or resend of a real-time message.

The first communication circuitry may be utilized for mobile wireless system communications and the second communication circuitry may be utilized for wireless connectivity communications. At least one of the first communication circuitry and the second communication circuitry may be concurrently communicating on at least one of multiple carriers and multiple radio access technologies.

The first communication circuitry and the second communication circuitry may be electrically coupled. The second communication circuitry may perform an operation to mitigate interference. If the first message is corrupted or lost, the first communication circuitry may receive a resend indicator.

An electronic device for identifying a radio access technology is also described. The electronic device includes a first communication circuitry. The electronic device also includes a second communication circuitry coupled to the first communication circuitry. The first communication circuitry and the second communication circuitry communicate with each other over a non-radio link. The first communication circuitry generates a first message that identifies a radio access technology, sends the first message to the second communication circuitry and sends a second message associated with the first message. The first message is of a first message type and the second message is of a second message type that is different from the first message type.

An apparatus for identifying a radio access technology is also described. The apparatus includes a first communication means for generating a first message that identifies a radio access technology, for sending the first message to a second communication means and for sending a second message associated with the first message. The first message is of a first message type and the second message is of a second message type that is different from the first message type. The first communication means and the second communication means communicate with each other over a non-radio link.

A computer-program product for identifying a radio access technology is also described. The computer-program product includes a non-transitory tangible computer-readable medium with instructions. The instructions include code for causing an electronic device to generate, by a first communication circuitry, a first message that identifies a radio access technology. The first message is of a first message type. The instructions also include code for causing the electronic device to send, by the first communication circuitry, the first message to a second communication circuitry. The first communication circuitry and the second communication circuitry communicate with each other over a non-radio link. The instructions further include code for causing the electronic device to send, by the first communication circuitry, a second message associated with the first message. The second message is of a second message type that is different from the first message type.

BRIEF DESCRIPTION OF THE DRAWINGS

FIG. 6 is a diagram illustrating an example of a second approach to identifying a RAT in accordance with the systems and methods described herein;

FIG. 7 is a diagram illustrating a more specific example of a second approach to identifying a RAT in accordance with the systems and methods described herein;

FIG. 8 is a diagram illustrating an example of a third approach to identifying a RAT in accordance with the systems and methods described herein;

FIG. 9 is a diagram illustrating a more specific example of a third approach to identifying a RAT in accordance with the systems and methods described herein;

DETAILED DESCRIPTION

Figure 1:
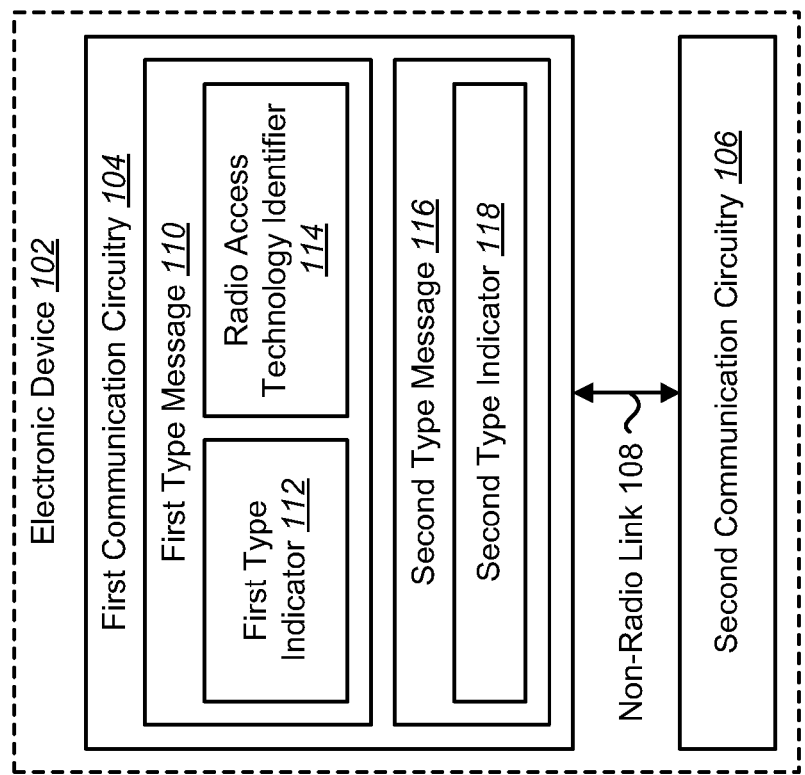
FIG. 1 is a block diagram illustrating one configuration of one or more electronic devices in which systems and methods for identifying a radio access technology (RAT) may be implemented.

Systems and methods for identifying a radio access technology (RAT) are described herein. A RAT is a mode of wireless communication. In particular, a RAT may refer to one or more wireless resources (e.g., time, frequency and/or spatial resources), protocols, procedures, devices, subscriptions and/or standards. Long Term Evolution (LTE) is one general example of a RAT, while a more specific example of a RAT is LTE on a particular band. Other examples of RATs include code division multiple access (CDMA), Global System for Mobile Communications (GSM), Institute of Electrical and Electronics Engineers (IEEE) 802.11 (Wi-Fi), Bluetooth (BT), etc.

Some devices may utilize multiple communication circuitries. For example, one communication circuitry may be utilized for mobile wireless system (MWS) (e.g., cellular) communications, while another communication circuitry may be utilized for wireless connectivity (WCN) communications. MWS may refer to larger wireless networks (e.g., wireless wide area networks (WWANs), cellular phone networks, LTE networks, GSM networks, CDMA networks, CDMA2000 networks, wideband CDMA (W-CDMA) networks, Universal Mobile Telecommunications System (UMTS) networks, Worldwide Interoperability for Microwave Access (WiMAX) networks, etc.). WCN may refer to relatively smaller wireless networks (e.g., wireless local area networks (WLANs), wireless personal area networks (WPANs), IEEE 802.11 (Wi-Fi) networks, BT networks, wireless Universal Serial Bus (USB) networks, etc.). Interference may occur between the circuitries, and more interference issues can arise if either of the communication circuitries concurrently uses more than a single carrier and/or RAT.

The systems and methods disclosed herein may be described in terms of one or more standards (e.g., LTE, IEEE 802.11, BT, etc.) for convenience. However, the systems and methods described herein may be implemented in a variety of wireless networks and may not be limited to the specific standards described.

In some configurations, the systems and methods described herein may be applied to provide enhancements to the wireless coexistence interface (WCI) (e.g., WCI-2) standard. Some WCI-2 background is given for clarity as follows.

WCI is the Bluetooth Special Interest Group (BT-SIG) standardized interface for MWS (e.g., wide area network (WAN) coexistence with WLAN/BT. The WCI-2 interface has been used widely across WAN/WCN industries. It may be used for future chip sets.

However, the known WCI-2 standard has limitations. For example, the known WCI-2 standard only supports a single MWS carrier and/or RAT coexistence with single WLAN band. However, there are cases that MWS might use multiple carriers and/or RATs simultaneously and/or cases that WLAN uses multiple carriers and/or bands simultaneously. For example, MWS may utilize LTE Carrier Aggregation (CA) and/or dual subscriber identity module (SIM)-card dual active (DSDA). Additionally or alternatively, an electronic device may perform WLAN dual band simultaneous (DBS) (e.g., utilize 2.4 gigahertz (GHz) and 5 GHz bands concurrently).

In one example, LTE may perform intra-band CA for band 40 (B40), where both carriers from LTE can have a coexistence issue (e.g., may interfere) with 2 GHz WLAN. In another example, LTE may perform inter-band CA for band 7 (B7) and band 3 (B3) while WLAN may perform 2 GHz/5 GHz DBS. In this example, LTE B7 may have coexistence issues with 2 GHz WLAN, and LTE B3 can have coexistence issues (e.g., may interfere) with the 5 GHz band.

The systems and methods disclosed herein may provide WCI-2 enhancements. In particular, there is a need for the WCI-2 interface to indicate transmit/receive (TX/RX) states of multiple carriers and/or RATs. It is beneficial for WLAN to know the TX/RX state of multiple concurrent MWS carriers/RATs. Similarly, it is beneficial for MWS to know the TX/RX state of multiple concurrent WLAN bands/channels.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of one or more electronic devices 102 in which systems and methods for identifying a radio access technology (RAT) may be implemented. Examples of the electronic device(s) 102 include smartphones, cellular telephones, headsets, personal digital assistants (PDAs), pagers, tablet devices, laptop computers, desktop computers, game systems, televisions, etc.

The one or more electronic devices 102 include a first communication circuitry 104 and a second communication circuitry 106. In some configurations, a single electronic device 102 may include the first communication circuitry 104 and the second communication circuitry 106. In other configurations, a first electronic device 102 may include the first communication circuitry 104 and a second (separate) electronic device 102 may include the second communication circuitry 106. For convenience hereinafter, one or more electronic devices may be referred to as a single electronic device. It should be noted, however, that any first communication circuitry and any second communication circuitry referred to herein may be included in a single electronic device or in separate electronic devices.

The first communication circuitry 104 may be implemented in hardware (e.g., circuitry) or in a combination of hardware and software. For example, the first communication circuitry 104 may be implemented as an application specific integrated circuit (ASIC) and/or as a processor with instructions stored in memory. The first communication circuitry 104 may provide one or more communication functions that enable communication in accordance with one or more RATs. For example, the first communication circuitry 104 may perform one or more of modulation, demodulation, encoding, decoding, scheduling, filtering, precoding, network scanning, network selection, control functions (e.g., requesting resource allocation, hybrid automatic repeat request (HARM), authentication, etc.), scrambling, descrambling, etc. In some configurations, the first communication circuitry 104 may enable MWS (e.g., cellular) communication between the electronic device 102 and one or more remote devices. One example of the first communication circuitry 104 is an MWS modulator/demodulator (modem). In other configurations, the first communication circuitry 104 may enable WCN communication between the electronic device 102 and one or more remote devices. Another example of the first communication circuitry 104 is a WCN communications chip.

The second communication circuitry 106 may be implemented in hardware (e.g., circuitry) or in a combination of hardware and software. For example, the second communication circuitry 106 may be implemented as an application specific integrated circuit (ASIC) and/or as a processor with instructions stored in memory. The second communication circuitry 106 may provide one or more communication functions that enable communication in accordance with one or more RATs. For example, the second communication circuitry 106 may perform one or more of modulation, demodulation, encoding, decoding, scheduling, filtering, precoding, network scanning, network selection, control functions (e.g., requesting resource allocation, hybrid automatic repeat request (HARM), authentication, etc.), scrambling, descrambling, etc. In some configurations, the second communication circuitry 106 may enable WCN communication between the electronic device 102 and one or more remote devices. One example of the second communication circuitry 106 is a WCN communications chip. In other configurations, the second communication circuitry 106 may enable MWS (e.g., cellular) communication between the electronic device 102 and one or more remote devices. Another example of the second communication circuitry 106 is an MWS modulator/demodulator (modem).

In some configurations, the first communication circuitry 104 may enable communication with one or more first wireless networks and the second communication circuitry 106 may enable communication with one or more second wireless networks. In some implementations, the first wireless network(s) may generally provide larger coverage areas than the second wireless network(s). For example, the first communication circuitry 104 may be utilized for MWS communications (with WWAN(s), for instance), while the second communication circuitry 106 may be utilized for WCN communications (with WLAN(s) and/or WPAN(s), for instance). Alternatively, the first communication circuitry 104 may be utilized for WCN communications, while the second communication circuitry 106 may be utilized for MWS communications.

The first communication circuitry 104 may be coupled to the second communication circuitry 106. As used herein, the term "couple" and variations thereof may indicate a direct or an indirect connection. For example, the first communication circuitry 104 may be directly connected to the second communication circuitry 106 without any intervening component or the first communication circuitry 104 may be indirectly connected to the second communication circuitry 106 with one or more intervening components. The first communication circuitry 104 and the second communication circuitry 106 may communicate with each other over a non-radio link 108. The non-radio link 108 provides communication different from the wireless communication carried out by the first communication circuitry 104 and/or the second communication circuitry 106. For example, the first communication circuitry 104 and the second communication circuitry 106 may perform wireless communication (with one or more remote devices) while also identifying one or more RATs by communicating with each other via the non-radio link 108 (e.g., non-radio interface). The non-radio link 108 may be implemented with a bus and/or with one or more wires. In some configurations, the first communication circuitry 104 may be coupled to the second communication circuitry 106 with two wires, where a first wire carries signals sent from the first communication circuitry 104 to the second communication circuitry 106 and where a second wire carries signals sent from the second communication circuitry 106 to the first communication circuitry 104.

Accordingly, the first communication circuitry 104 and the second communication circuitry 106 may be electrically coupled over the non-radio link 108. For example, the first communication circuitry 104 and the second communication circuitry 106 may communicate with each other using electrical or electronic signals via one or more wires. Accordingly, messages between the first communication circuitry 104 and the second communication circuitry 106 may be sent and/or received on an electrically coupled interface.

The non-radio link 108 may carry control data between the first communication circuitry 104 and the second communication circuitry 106. For example, the non-radio link 108 may not carry payload data (e.g., user payload data). Accordingly, the information carried on the non-radio link 108 may be on a control plane and not on a payload data plane. The non-radio link 108 may be utilized to coordinate wireless communications performed by the first communication circuitry 104 and the second communication circuitry 106.

The first communication circuitry 104, the second communication circuitry 106 or both may be capable of concurrently communicating on multiple bands, multiple carriers and/or in accordance with multiple RATs. For example, the first communication circuitry 104 may provide LTE communications with inter-band and/or intra-band carrier aggregation. Additionally or alternatively, the first communication circuitry 104 may provide LTE data service while concurrently providing GSM voice service. The first communication circuitry 104 may additionally or alternatively concurrently communicate based on multiple subscriptions (e.g., DSDA). Continuing the example, the second communication circuitry 106 may additionally or alternatively provide concurrent dual-band (or triple-band) WLAN communication and/or Bluetooth communication. Accordingly, the electronic device 102 may include multiple radios, where each radio (e.g., first communication circuitry 104 and second communication circuitry 106) may operate on multiple frequency bands.

The first communication circuitry 104 and/or the second communication circuitry 106 may generate one or more messages. A message may include a series of bits. Each of the messages may be of a particular type. For example, the first communication circuitry 104 and/or the second communication circuitry 106 may be configured to utilize a predetermined set of message types.

The first communication circuitry 104 may generate a first message 110 that identifies a RAT, where the first message 110 is of a first message type. In other words, the first communication circuitry 104 may generate a first type message 110. The first type message 110 may include a first type indicator 112 and a RAT identifier 114. It should be noted that the first type message 110 may identify a RAT, but may not identify the electronic device 102 itself. For example, the first type message 110 may be utilized to identify a RAT to the second communication circuitry 106, but may not be utilized to identify the electronic device 102 to a remote device (e.g., base station, network device, etc.).

In some configurations, the first type message 110 may include a set of bits. One or more of the set of bits may be utilized for a type field (e.g., for the first type indicator 112). One or more of the bits may be utilized for a message field. The RAT identifier 114 may comprise one or more bits of the message field in some configurations. It should also be noted that one or more bits in the message field may be utilized. For example, the RAT identifier 114 may not include all of the bits of the message field in some configurations.

The first type indicator 112 may indicate the type of the first type message 110. For example, the first type indicator 112 may include one or more bits that indicate a first type. The first type may be one type of a set of types. For example, the first type indicator may indicate type1, type7 or another message type. Accordingly, the first type message 110 may be a type1 message, a type7 message, or another type of message.

The RAT identifier 114 may identify a particular RAT (e.g., a RAT and/or a RAT with a corresponding band and/or carrier). For instance, the RAT identifier 114 may include one or more bits that identify a particular RAT. The RAT identifier 114 may correspond to a RAT that the first communication circuitry 104 may utilize (e.g., is capable of utilizing). For example, the RAT identifier 114 may identify LTE, GSM or CDMA2000. In another example, the RAT identifier 114 may identify LTE on a particular band (e.g., B7, B3, etc.).

In some configurations, the first communication circuitry 104 may send an interpretation corresponding to one or more RAT identifiers 114 to the second communication circuitry 106. The interpretation may indicate that a particular RAT identifier 114 corresponds to a particular RAT (with or without one or more corresponding band(s) and/or carrier(s)). The first communication circuitry 104 may send one or more messages that provide the interpretation of the RAT identifiers 114. For example, the first communication circuitry 104 may send one or more type2 messages to the second communication circuitry 106 to provide the interpretation.

In some configurations, the interpretation may be a mapping between the bit patterns of the RAT identifiers 114 and the RATs. For example, the interpretation may indicate that a bit pattern of '0000' indicates LTE and that a bit pattern of '0001' indicates GSM. In another example, the interpretation may indicate that a bit pattern of '0000' indicates LTE on B3, that a bit pattern of '0001' indicates LTE on B7 and that a bit pattern of '0010' indicates GSM on a particular band.

In some configurations, the first communication circuitry 104 and/or the second communication circuitry 106 may include a set (e.g., list, array, table, tree, etc.) of RAT indicators. Each of the RAT indicators may have a corresponding index or structural position. The interpretation may provide a mapping between bit pattern(s) of the RAT identifier(s) 114 and the index or structural position. For example, the first communication circuitry 104 may determine one or more RATs (with or without one or more corresponding bands and/or carriers) that are being utilized. The first communication circuitry 104 may extract (e.g., look up) the index or structural position of the corresponding RAT indicator(s) from the set. The first communication circuitry 104 may generate a mapping between one or more bit patterns of the RAT identifiers 114 and the one or more indices or structural positions. The first communication circuitry 104 may send this interpretation (e.g., mapping) to the second communication circuitry 106. The second communication circuitry 106 may utilize this interpretation (e.g., mapping) to interpret the RAT identifiers 114 (e.g., look up the RAT indicators corresponding to the RAT identifiers 114).

In some configurations, the interpretation of the RAT identifiers 114 may be predetermined. In these configurations, the first communication circuitry 104 and the second communication circuitry 106 may utilize the predetermined interpretation to interpret the RAT identifiers 114. The predetermined interpretation may be changed and/or updated in some configurations. For example, the first communication circuitry 104 may send an updated interpretation to the second communication circuitry 106 to confirm and/or modify the interpretation utilized by the second communication circuitry 106.

In some configurations, the first type message 110 may be a type1 message. The type1 message may be masked to avoid indicating send or resend of a real-time message. For example, the type1 message may typically be utilized to indicate send or resend of a real-time message when a particular bit is set to '1.' However, the type1 message may be masked by setting this bit to '0' and utilizing other bits in the type1 message to identify a RAT.

The first communication circuitry 104 may send the first type message 110 (that identifies a RAT) to the second communication circuitry 106. The first type message 110 may be sent to the second communication circuitry 106 over the non-radio link 108 (e.g., via the coupling).

The first communication circuitry 104 may generate a second type message 116. The second type message 116 may be of a second message type that is different from the first message type. The second type message 116 may include a second type indicator 118. For example, the second type indicator 118 may include one or more bits that indicate a second type. The second type may be another type of the set of types that includes both the first type and the second type. For example, the second type indicator 118 may indicate type0 or another message type. Accordingly, the second type message 116 may be a type0 message or another type of message.

The second type message 116 may be associated with the first type message 110. For example, the first type message 110 may indicate a RAT corresponding to the second type message 116. More specifically, information included in the second type message 116 may be relevant to the RAT indicated by the first type message 110. As described above, known approaches may not distinguish between RATs. However, the systems and methods disclosed herein may enable identification of one or more RATs and/or one or more RATs with one or more corresponding bands and/or carriers. In this way, the first communication circuitry 104 and the second communication circuitry 106 may provide more detailed RAT identification, which may enable improved coordination between the first communication circuitry 104 and the second communication circuitry 106. For example, the first communication circuitry 104 and/or the second communication circuitry 106 may utilize the RAT identification in order to reduce and/or avoid wireless interference. It should be noted that the first type message 110 and/or the second type message 116 may not be utilized to initially establish communication.

In some configurations, the second type message 116 may indicate a status. For example, the second type message 116 may include a status indicator that indicates a real-time signal status and/or a RAT status. For instance, the second type message 116 may be a type0 message. The association between the first type message 110 and the second type message 116 may indicate a correspondence between a particular RAT and the content of the second type 116 message. For example, the second type message 116 may indicate a status of real-time signals for the RAT indicated by the first type message 110. In other examples, the second type message 116 may provide other information. For instance, the second type message 116 may indicate one or more numbers of carriers, carrier frequencies, bands, etc., that are utilized by the RAT indicated in the first type message 110. Accordingly, the first communication circuitry 104 and/or the second communication circuitry 106 may communicate such that the first communication circuitry 104 and/or the second communication circuitry 106 may be aware of when each other is sending and/or receiving over radio links. In other words, the first communication circuitry 104 and/or the second communication circuitry 106 may exchange messages that provide wireless communication transmit and/or receive state information of each other.

The first communication circuitry 104 may send the second type message 116 that is associated with the first type message 110 to the second communication circuitry 106. The second type message 116 may be sent to the second communication circuitry 106 over the non-radio link 108. The association between the first type message 110 and one or more second type messages 116 may be indicated by the sequence in which they are sent.

In a first approach, one or more second type messages 116 may be sent after the associated first type message 110. For example, one or more second type messages 116 may be associated with the most recent first type message 110 sent. Additionally or alternatively, the first communication circuitry 104 may send at least one additional message associated with the first type message 110, where the at least one additional message is of the second type message 116 type and/or is of a type that is different from the type of the first type message 110. More detail regarding this first approach is given in connection with FIGS. 4-5.

In some configurations of the first approach, if the first type message 110 that identifies a RAT is corrupted or lost (when sent to the second communication circuitry 106), then the second communication circuitry 106 may drop the one or more associated second type messages 116. In this case, the second communication circuitry 106 may send a message with a resend indicator (e.g., with a "(RE)SEND_REAL_TIME" bit set) to the first communication circuitry 104. The first communication circuitry 104 may respond by resending the first type message 110 and the one or more associated second type messages 116.

In a second approach, one or more second type messages 116 may be sent before the first type message 110. For example, one or more second type messages 116 may be associated with a subsequently sent first type message 110. Additionally or alternatively, the first communication circuitry 104 may send at least one additional message associated with the first type message 110 (before sending the first type message 110), where the at least one additional message is of the second type message 116 type and/or is of a type that is different from the type of the first type message 110. In one specific implementation of the second approach, the first type message 110 may be appended at the end of a second type message 116. In some configurations, a first type message 110 may be appended to only a single second type message 116. In other words, a first type message 110 may be appended to each second type message 116. More detail is given in connection with FIGS. 6-7.

In some configurations of the second approach, if the first type message 110 that identifies a RAT is corrupted or lost (when sent to the second communication circuitry 106), then the second communication circuitry 106 may drop the one or more associated second type messages 116. In this case, the second communication circuitry 106 may send a message with a resend indicator (e.g., with a "(RE)SEND_REAL_TIME" bit set) to the first communication circuitry 104. The first communication circuitry 104 may respond by resending the one or more second type messages 116 and the associated first type message 110.

In a third approach, the first type message 110 may be sent before the second type message 116. In this approach, a first type message 110 that identifies a RAT is sent before each associated second type message 116. For example, only a single first type message 110 may be sent before each second type message 116. More detail is given in connection with FIGS. 8-9.

In some configurations of the third approach, if the first type message 110 that identifies a RAT is corrupted or lost (when sent to the second communication circuitry 106), then the second communication circuitry 106 may drop the associated second type message 116. In this case, the second communication circuitry 106 may send a message with a resend indicator (e.g., with a "(RE)SEND_REAL_TIME" bit set) to the first communication circuitry 104. The first communication circuitry 104 may respond by resending the first type message 110 and the associated second type message 116.

The first communication circuitry 104 may send multiple first type messages 110 (each with one or more associated messages, for example). Each of the first type messages 110 may identify a RAT. Accordingly, each of the first type messages 110 may identify the same or a different (e.g., separate) RAT (with the same or different band(s)/carrier(s), for instance). For example, the first communication circuitry 104 may be concurrently communicating on multiple RATs and/or on multiple bands and/or carriers. Each of the multiple first type messages 110 may identify each of the RATs, while each of the associated second type messages 116 may indicate a status of each of the RATs. In some configurations, the second communication circuitry 106 may send a request for the status of all of the RATs. The first communication circuitry 104 may respond by sending one or more first type messages 110, each with one or more associated second type messages 116.

In some configurations, the second communication circuitry 106 may perform one or more operations to mitigate interference (between the first communication circuitry 104 and the second communication circuitry 106). The operation(s) to mitigate interference may be based on the first type message 110 and/or the second type message 116. For example, the second communication circuitry 106 may detect whether the status of any identified RAT utilized by the first communication circuitry 104 may cause interference with any RAT utilized by the second communication circuitry 106. Some scenarios that may trigger operation(s) to mitigate interference may include when RATs utilized by the first communication circuitry 104 and the second communication circuitry 106 would transmit in overlapping time frames and/or frequencies, receive in overlapping time frames and/or frequencies and/or transmit and receive in overlapping time frames. For instance, the second communication circuitry 106 may perform one or more operations to mitigate interference if the first communication circuitry 104 is utilizing (or will utilize) a RAT with a band to receive a wireless signal while the second communication circuitry 106 is utilizing (or will utilize) a RAT with an overlapping band and/or carrier to transmit a wireless signal.

Examples of operations for mitigating interference follow. The second communication circuitry 106 may pause or interrupt transmission and/or reception for a period to reduce and/or avoid interference. Additionally or alternatively, the second communication circuitry 106 may change bands, carriers and/or RATs to reduce and/or avoid interference. Additionally or alternatively, the second communication circuitry 106 may reduce (e.g., back off) a transmission power in one or more bands and/or carriers to reduce and/or avoid interference. Additionally or alternatively, the second communication circuitry 106 may send one or more messages to the first communication circuitry 104 that request or command that the first communication circuitry 104 perform one or more operations to reduce and/or avoid interference.

It should be noted that the second communication circuitry 106 may perform one or more of the functions that are described in connection with the first communication circuitry 104. One or more of these functions may be performed relative to the RAT(s) utilized by the second communication circuitry 106. For example, the second communication circuitry 106 may also generate and send one or more first type messages that identify one or more RATs. The second communication circuitry 106 may also generate and send one or more second type messages associated with the first type messages. The second communication circuitry 106 may send messages to the first communication circuitry over the non-radio link 108. The first communication circuitry 104 may perform one or more operations to mitigate or avoid interference (with the second communication circuitry 106) as described in connection with the second communication circuitry 106.

It should be noted that communications over the non-radio link 108 may not be utilized in a connectionless context in some configurations (e.g., the non-radio link 108 may be connection-oriented). It should also be noted that switching RATs may be accomplished independently of identifying RATs. For example, the systems and methods disclosed herein may enable the identification of multiple RATs between the first communication circuitry 104 and the second communication circuitry 106. RAT identification could be utilized for performing RAT switching. Additionally or alternatively, RAT identification could be utilized for handling contention (in wireless resources) between the first communication circuitry 104 and the second communication circuitry 106. However, RAT identification may be utilized in other contexts (e.g., mitigating and/or avoiding interference (e.g., inter-RAT interference)) that do not involve RAT switching and/or handling contention.

Some implementations of the systems and methods described herein may extend the WCI-2 standard. For clarity, parts of the Wireless Coexistence Interface 2 (WCI-2) Transport Specification are given below (in Tables 1-5). This WCI-2 Transport Specification is part of the Bluetooth Core Specification Addendum 3 rev. 2 (Jul. 24, 2012).

In some configurations of the systems and methods disclosed herein, the first type message 110 and/or the second type message 116 may be structured similarly to the following format (e.g., two-wire message types). 8-bit universal asynchronous receiver/transmitter (UART) characters may be split into a 3-bit type field and a 5-bit message field as illustrated in Table 1. In Table 1, "b0" through "b7" indicate bit numbers or bit indices in a message (e.g., in a first type message 110 or in a second type message 116). Accordingly, Type[0]-Type[2] denote bits in the type field and MSG[0]-MSG[4] denote bits in the message field.

TABLE 1

Transport Layer Format

| b0 | b1 | b2 | b3 | b4 | b5 | b6 | b7 |
|---|---|---|---|---|---|---|---|
| Type [0] | Type [1] | Type [2] | MSG [0] | MSG [1] | MSG [2] | MSG [3] | MSG [4] |

Eight message types are defined in Table 2. Although "BT" is utilized in Table 2 to denote Bluetooth communication circuitry, "BT" may more generally refer to the second communication circuitry 106 (e.g., WCN communication circuitry). Furthermore, although "MWS" denotes MWS communication circuitry (e.g., an MWS modem), "MWS" may more generally refer to the first communication circuitry 104. It should be noted that "RFU" is an abbreviation for "reserved for future use."

TABLE 2

Message Type Indicator

| Message Type Indicator | Direction | Message Type |
|---|---|---|
| 0 × 00 | MWS ↔ BT | Real-time Signal Message |
| 0 × 01 | MWS ↔ BT | Transport Control Message |
| 0 × 02 | MWS ↔ BT | Transparent Data Message |
| 0 × 03 | MWS → BT | MWS Inactivity Duration Message |
|  | BT → MWS | RFU |
| 0 × 04 | MWS → BT | MWS Scan Frequency Message |
|  | BT → MWS | RFU |
| 0 × 05 | MWS → BT | RFU |
|  | BT → MWS | RFU |
| 0 × 06 |  | Vendor Specific |
| 0 × 07 |  | Vendor Specific |

The hexadecimal values illustrated in Table 2 (e.g., 0x00, 0x01, 0x02, 0x03, 0x04, 0x05, 0x06 and 0x07) may correspond to binary values utilized in the type field illustrated in Table 1. For example, '000' may indicate a type0 message, '001' may indicate a type1 message, '010' may indicate a type2 message, '011' may indicate a type3 message, '100' may indicate a type4 message, '101' may indicate a type5 message, '110' may indicate a type6 message and '111' may indicate a type7 message. '001' (indicating a type1 message, for instance) may be one example of the first type indicator 112 and '111' (indicating a type7 message, for instance) may be another example of the first type indicator 112. '000' (indicating a type0 message, for instance) may be one example of the second type indicator 118 and '010' (indicating a type2 message, for instance) may be another example of the second type indicator 118.

Table 3 illustrates one example of type1 message structure. As described above, the type1 message may be one example of the first type message 110. It should be noted that the first type message 110 (e.g., bits MSG[1]-[4]) may have the same interpretation to both the first communication circuitry 104 and the second communication circuitry 106 or may have different interpretations between the first communication circuitry 104 and the second communication circuitry 106 (as described in more detail in connection with FIG. 3).

TABLE 3

| Type1 Message (e.g., Transport Control Message) | | | | |
|---|---|---|---|---|
| MSG[0] | MSG[1] | MSG[2] | MSG[3] | MSG[4] |
| RESEND_REAL_TIME | RFU | RFU | RFU | RFU |

In the case of a type1 message, the MSG[0] bit is set (to '1,' for example) to request a status update of real-time signals. However, when the type1 message is utilized to identify a RAT, the MSG[0] bit may be set to 0 in order to mask the type1 message. Then, the remaining message bits (e.g., MSG[1]-MSG[4]) may be utilized to identify a particular RAT. In other words, the remaining message bits (e.g., MSG[1]-MSG[4]) may be an example of the RAT identifier 114 included in the first type message 110. As described above, one or more type0 messages may be associated with the type1 message, where the type1 message identifies a RAT corresponding to the one or more type0 messages.

It should be noted that while the type1 message is given as one example, other message types may be utilized. For example, though the reserved (RFU) bits of the type1 message (e.g., "RESEND_REAL_TIME" message) may be utilized to identify a RAT, if these bits are designated for a different purpose in the future (e.g., in a future standard), then a different message type may be utilized (e.g., type7 or other message type) to identify a RAT. For example, if a type7 message is utilized, the first type indicator 112 may be '111' and one or more bits of the message field of the type7 message may be utilized as the RAT identifier 114.

Table 4 provides one example of type0 message structure. As described above, the type0 message may be one example of the second type message 116. This structure may be utilized when the type0 message is sent from the first communication circuitry 104 to the second communication circuitry 106 (e.g., from an MWS modem to WCN communication circuitry).

TABLE 4

| Real-time Signaling Message, MWS device → WCN | | | | |
|---|---|---|---|---|
| MSG[0] | MSG[1] | MSG[2] | MSG[3] | MSG[4] |
| FRAME_SYNC | MWS_RX | MWS_TX | PATTERN[0] | PATTERN[1] |

In the structure provided by Table 4, MSG[0] (e.g., FRAME_SYNC) may be set to indicate the beginning (e.g., time) of a communication frame corresponding to the first communication circuitry 104. MSG[1] (e.g., MWS_RX) may be set to indicate that the first communication circuitry 104 is receiving a wireless signal. MSG[2] (e.g., MWS_TX) may be set to indicate that the first communication circuitry 104 is transmitting a wireless signal. If the second communication circuitry 106 is operating in a similar band as the first communication circuitry 104 (based on the RAT and/or band identified by the first type message 110), a set MSG[1] or a set MSG[2] may also request that the second communication circuitry 106 stop operating in that band while the first communication circuitry 104 receives or transmits the wireless signal. In some configurations, if the second communication circuitry 106 is not operating in a similar band as the first communication circuitry 104, the second communication circuitry 106 may continue to operate (in a different band, for example). This illustrates one benefit of the systems and methods disclosed herein, where communication operations for both the first communication circuitry 104 and the second communication circuitry 106 may continue if no conflicting communications are occurring between the first communication circuitry 104 and the second communication circuitry 106. MSG[3]-[4] (e.g., PATTERN[0] and PATTERN[1]) may be utilized to indicate one or more signaling patterns.

Table 5 provides one example of type0 message structure. This structure may be utilized when the type0 message is sent from the second communication circuitry 106 to the first communication circuitry 104 (e.g., from WCN communication circuitry to an MWS modem).

TABLE 5

| Real-time Signaling Message, WCN → MWS device | | | | |
|---|---|---|---|---|
| MSG[0] | MSG[1] | MSG[2] | MSG[3] | MSG[4] |
| BT_RX_PRI | BT_TX_ON | 802_RX_PRI | 802_TX_ON | RFU |

In the structure provided by Table 5, MSG[0] (e.g., BT_RX_PRI) may be set to indicate that the second communication circuitry 106 (e.g., BT) expects to receive a high priority wireless signal. MSG[1] (e.g., BT_TX_ON) may be set to indicate that the second communication circuitry 106 (e.g., BT) is transmitting a wireless signal. MSG[2] (e.g., 802_RX_PRI) may be set to indicate that the second communication circuitry 106 (e.g., IEEE 802.11) expects to receive a high priority wireless signal. MSG[3] (e.g., 802_TX_ON) may be set to indicate that the second communication circuitry 106 (e.g., IEEE 802.11) is transmitting a wireless signal. If the first communication circuitry 104 is operating in a similar band as the second communication circuitry 106 (based on the RAT and/or band identified by a message sent from the second communication circuitry 106), setting one or more of MSG[1]-[4] may also request that the first communication circuitry 104 avoid operating in that band while the second communication circuitry 106 receives or transmits a wireless signal. In some configurations, if the first communication circuitry 104 is not operating in a similar band as the second communication circuitry 106, the first communication circuitry 104 may continue to operate (in a different band, for example). MSG[4] may be reserved for future use.

Figure 2:
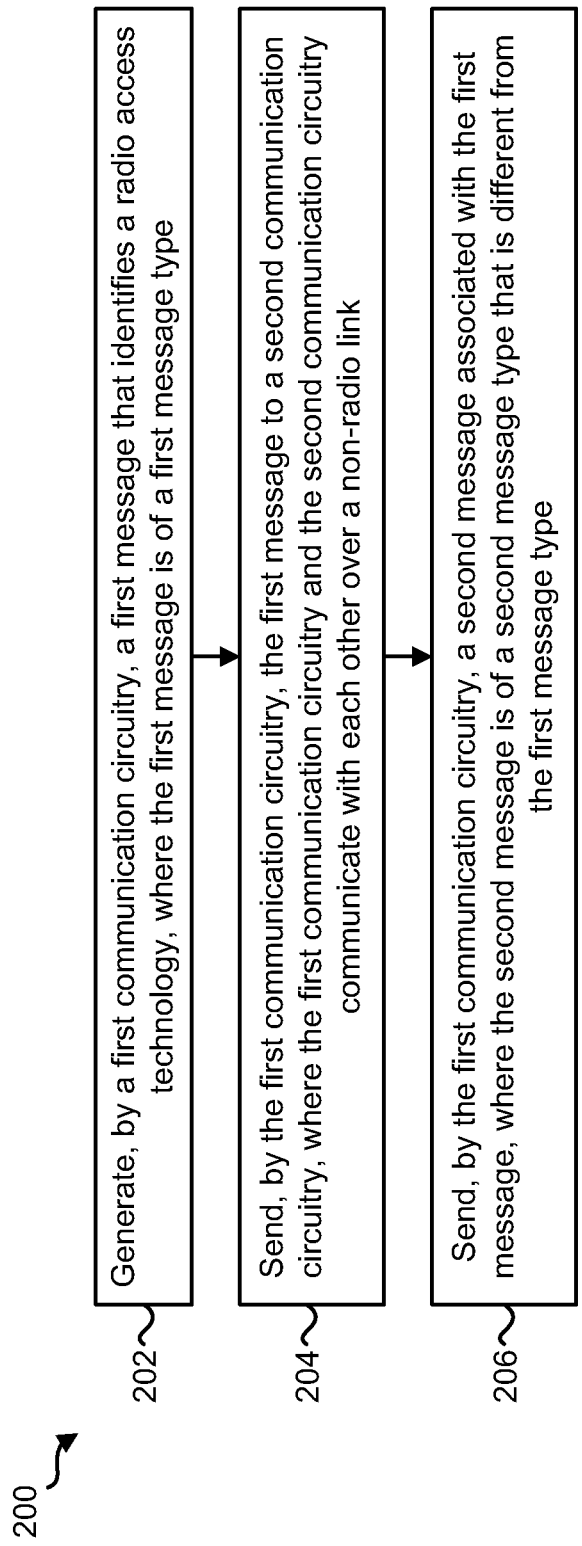
FIG. 2 is a flow diagram illustrating one configuration of a method for identifying a RAT by an electronic device.

FIG. 2 is a flow diagram illustrating one configuration of a method 200 for identifying a RAT by an electronic device 102. The electronic device 102 may generate 202, by a first communication circuitry 104, a first message 110 that identifies a RAT, where the first message 110 is of a first message type. This may be accomplished as described above in connection with FIG. 1. For example, the first communication circuitry 104 may generate a first type message 110 that includes a first type indicator 112 and a RAT identifier 114. In some configurations, the first type message 110 may be a type0 message.

The electronic device 102 may send 204, by the first communication circuitry 104, the first message 110 (e.g., the first type message 110) to the second communication circuitry 106. This may be accomplished as described above in connection with FIG. 1. For example, the first communication circuitry 104 may send 204 the first type message 110 as an electrical or electronic signal over one or more wires to the second communication circuitry 106. As described above, the first communication circuitry 104 and the second communication circuitry 106 may communicate with each other over a non-radio link 108.

The electronic device 102 may send 206, by the first communication circuitry 104, a second message 116 associated with the first message 110. The second message 116 may be of a second message type that is different from the first message type. This may be accomplished as described above in connection with FIG. 1. For example, the first communication circuitry 104 may send 206 the second type message 116 as an electrical or electronic signal over one or more wires to the second communication circuitry 106. It should be noted that the method 200 may include one or more additional procedures as described above in connection with FIG. 1 in some configurations.

Figure 3:
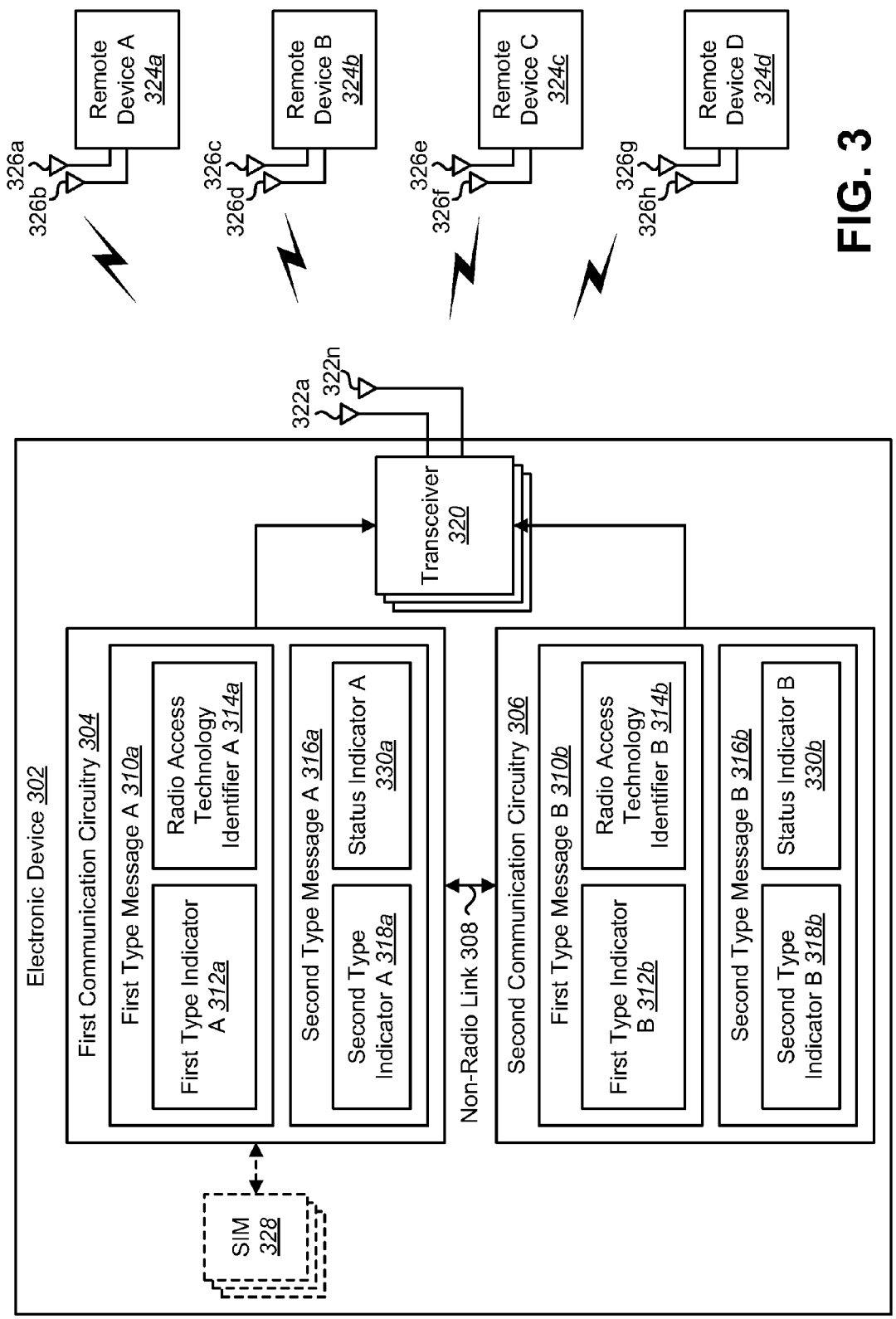
FIG. 3 is a block diagram illustrating a more specific configuration of an electronic device in which systems and methods for identifying a RAT may be implemented.

FIG. 3 is a block diagram illustrating a more specific configuration of an electronic device 302 in which systems and methods for identifying a RAT may be implemented. The electronic device 302 and/or one or more components of the electronic device 302 described in connection with FIG. 3 may be examples of the electronic device 102 and/or one or more corresponding components of the electronic device 102 described in connection with FIG. 1. For instance, the first communication circuitry 304 described in connection with FIG. 3 may be one example of the first communication circuitry 104 described in connection with FIG. 1. Furthermore, the second communication circuitry 306 described in connection with FIG. 3 may be one example of the second communication circuitry 106 described in connection with FIG. 1.

The electronic device 302 includes a first communication circuitry 304 and a second communication circuitry 306. The first communication circuitry 304 may enable communication with one or more remote devices 324a-d in accordance with one or more RATs on one or more bands and/or carriers. For example, the first communication circuitry 304 may be an MWS modem. The second communication circuitry 306 may enable communication with one or more remote devices 324a-d in accordance with one or more RATs on one or more bands and/or carriers. For example, the second communication circuitry 306 may be a WCN communications chip.

The first communication circuitry 304 and the second communication circuitry 306 may be coupled to one or more transceivers 320. In some configurations, the first communication circuitry 304 and the second communication circuitry 306 may be coupled to separate transceivers 320 (with separate antennas, for example). In other configurations, the first communication circuitry 304 and the second communication circuitry 306 may share one or more transceivers 320. The first communication circuitry 304 and the second communication circuitry 306 may provide data (e.g., payload data and/or control data) to the one or more transceivers 320 for wireless transmission to one or more of the remote devices 324a-d.

Each of the one or more transceivers 320 may be coupled to one or more antennas 322a-n. Each of the one or more transceivers 320 may perform one or more of upconversion, downconversion, multiplexing, amplification, etc. The transceiver(s) 320 may radiate wireless electromagnetic signals via one or more antennas 322a-n. One or more of the remote devices 324a-d may receive the wireless electromagnetic signals via one or more antennas 326. For example, remote device A 324a may include one or more antennas 326a-b, remote device B 324b may include one or more antennas 326c-d, remote device C 324c may include one or more antennas 326e-f and remote device D 324d may include one or more antennas 326g-h.

In some configurations, the first communication circuitry 304 may enable communication with one or more first wireless networks and the second communication circuitry 306 may enable communication with one or more second wireless networks. In one example, remote device A 324a and remote device B 324b may be part of first wireless networks. For instance, remote device A 324a may provide communication with an LTE network and remote device B 324b may provide communication with a GSM network. In particular, remote device A 324a may be an LTE base station and remote device B 324b may be a GSM base station. Continuing the example, remote device C 324c and remote device D 324d may be part of second wireless networks. For instance, remote device C 324c may be an IEEE 802.11 router and remote device D 324d may be a Bluetooth device. Although this specific example is provided for clarity, it should be noted that more or fewer and/or different types of remote devices 324 may be utilized in accordance with the systems and methods disclosed herein. Each of the remote devices 324a-d may provide communications in accordance with one or more RATs.

The first communication circuitry 304 may be coupled to the second communication circuitry 306. The first communication circuitry 304 and the second communication circuitry 306 may communicate with each other over a non-radio link 308. For example, the first communication circuitry 304 and the second communication circuitry 306 may perform wireless communication (with the one or more remote devices 324a-d) while also identifying one or more RATs by communicating with each other via the non-radio link 308 (e.g., non-radio interface). The non-radio link 308 may carry control data between the first communication circuitry 304 and the second communication circuitry 306. The non-radio link 308 may be utilized to coordinate wireless communications performed by the first communication circuitry 304 and the second communication circuitry 306 with the one or more remote devices 324a-d.

The first communication circuitry 304, the second communication circuitry 306 or both may be capable of concurrently communicating on multiple bands, multiple carriers and/or in accordance with multiple RATs. For example, one or more of the first communication circuitry 304 and the second communication circuitry 306 may utilize inter-band carrier aggregation, intra-band carrier aggregation, DBS (or tri-band simultaneous) and/or DSDA.

In one scenario, for instance, remote device A 324a may be an LTE base station that provides inter-band carrier aggregation in communications for data service with the first communication circuitry 304. Additionally, remote device B 324b may be a GSM base station that provides voice services to the first communication circuitry 304. As illustrated in FIG. 3, the first communication circuitry 304 may be optionally coupled to one or more SIMs 328 (e.g., SIM cards). In some cases, the first communication circuitry 304 may perform DSDA by communicating with remote device A 324a (e.g., an LTE base station) using a subscription from one SIM 328 while concurrently communicating with remote device B 324b (e.g., a GSM base station) using a subscription from another SIM 328.

Continuing with the scenario, remote device C 324c may be an IEEE 802.11 router and remote device D 324d may be a Bluetooth device. Remote device C 324c may perform DBS (or tri-band simultaneous) in communications with the second communication circuitry 306. Additionally, remote device D 324d may also communicate with the second communication circuitry 306. Wireless interference may occur between RATs if similar time frames and/or frequencies are utilized by multiple RATs for wireless transmission and/or reception.

As described above, the first communication circuitry 304 and/or the second communication circuitry 306 may generate one or more messages. The one or more messages may identify one or RATs and/or corresponding RAT activity. The first communication circuitry 304 may generate first type message A 310a. First type message A 310a may include first type indicator A 312a and RAT identifier A 314a. First type indicator A 312a may indicate the type (e.g., type1 or type7) of first type message A 310a.

RAT identifier A 314a may identify a particular RAT (e.g., a RAT and/or a RAT with a corresponding band and/or carrier). For example, RAT identifier A 314a may identify LTE for communications corresponding to remote device A 324a or may identify GSM for communications corresponding to remote device B 324b. In another example, the RAT identifier A 314a may identify LTE on B3, LTE on B7 (where B3 and B7 are utilized for inter-band carrier aggregation, for example) or GSM.

As described above, the first communication circuitry 304 may optionally send an interpretation corresponding to one or more RAT identifiers A 314a to the second communication circuitry 306. For example, the interpretation may indicate a mapping between bit patterns of RAT identifiers A 314a and LTE on B3, LTE on B7 and GSM.

In some configurations, first type message A 310a may be a type1 message. The type1 message may include 8 bits, where 3 bits may be utilized as a type field and 5 bits may be utilized as a message field. For example, the 3 bits may indicate that first type message A 310a is a type1 message. The type1 message may be masked to avoid indicating send or resend of a real-time message. For instance, one bit of the message field, when set, may indicate send or resent of a real-time message. The type1 message may be masked by clearing this bit of the message field. The remaining bits (e.g., 4 bits) in the message field may be used to identify a RAT. For example, '0000' may identify LTE on B3, '0001' may identify LTE on B7 and '0010' may identify GSM. The first communication circuitry 304 may send first type message A 310a to the second communication circuitry 306.

The first communication circuitry 304 may generate second type message A 316a. Second type message A 316a may be of a second message type that is different from the first message type. Second type message A 316a may include second type indicator A 318a and status indicator A 330a. For example, second type indicator A 318a may indicate type0. Second type message A 316a may be associated with first type message A 310a.

Status indicator A 330a may indicate a real-time signal status and/or a RAT status. The association between first type message A 310a and second type message A 316a may indicate a correspondence between the RAT identified by first type message A 310a and the status indicated by second type message A 316a (e.g., status indicator A 330a). In particular, status indicator A 330a may indicate a real-time transmit or receive status for the RAT identified by RAT identifier A 314a. In other words, status indicator A 330a may indicate whether the first communication circuitry 304 is currently (or is anticipating) transmitting or receiving on the RAT identified by RAT identifier A 314a. In one example, RAT identifier A 314a identifies LTE on B3 and status indicator A 330a indicates transmit status. This indicates, for example, that the first communication circuitry 304 is transmitting data to an LTE base station (e.g., remote device A 324a) on B3. In some configurations, status indicator A 330a may be structured as described above in connection with Table 4.

The first communication circuitry 304 may send second type message A 316a to the second communication circuitry 306. Second type message A 316a may be sent to the second communication circuitry 306 over the non-radio link 308.

The association between first type message A 310a and one or more second type messages 316 may be indicated by the sequence in which they are sent. One or more of the approaches described above may be utilized to indicate the association between first type message A 310a and second type message A 316a. For example, one or more second type message As 316a may be sent after the associated first type message A 310a or one or more second type message As 316a may be sent before the associated first type message A 310a. In some configurations, there may be only a single first type message A 310a per second type message A 316a. As described above, if first type message A 310a that identifies a RAT is corrupted or lost (when sent to the second communication circuitry 306), then the second communication circuitry 306 may drop the one or more associated second type messages 316 and/or may send a message with a resend indicator to the first communication circuitry 304. The first communication circuitry 304 may respond by resending first type message A 310a and the one or more associated second type message As 316a.

In some configurations, the second communication circuitry 306 may perform one or more operations to mitigate interference (between the first communication circuitry 304 and the second communication circuitry 306) as described above. For example, the second communication circuitry 306 may perform operation(s) to mitigate interference if multiple RATs being utilized by the first communication circuitry 104 and the second communication circuitry 106 would transmit, receive or transmit and receive in overlapping time frames, frequency bands and/or carriers.

As illustrated in FIG. 3, the second communication circuitry 306 may generate and/or send first type message B 310b and/or second type message B 316b. First type message B 310b may include first type indicator B 312b and RAT identifier B 314b. Second type message B 316b may include second type indicator B 318b and status indicator B 330b. First type message B 310b, first type indicator B 312b, RAT identifier B 314b, second type message B 316b, second type indicator B 318b and/or status indicator B 330b may be similar to one or more of the corresponding elements included in the first communication circuitry 304 described in connection with FIG. 3 and/or included in the first communication circuitry 104 described in connection with FIG. 1. However, each of these elements may be relevant to the one or more RATs (and/or band(s)/carrier(s) of RAT(s)) and status thereof corresponding to the second communication circuitry 306. In particular, the association between first type message B 310b and second type message B 316b may indicate a correspondence between the RAT identified by first type message B 310b and the status indicated by second type message B 316b (e.g., status indicator B 330b). For example, status indicator B 330b may indicate a real-time transmit or receive status for the RAT identified by RAT identifier B 314b. In other words, status indicator B 330b may indicate whether the second communication circuitry 306 is currently (or is anticipating) transmitting or receiving on the RAT identified by RAT identifier B 314b.

In a configuration where the second communication circuitry utilizes WCN RATs (e.g., IEEE 802.11, Bluetooth, etc.), first type message B 310b may identify a WCN RAT and an associated second type message B 316b may indicate the status of the WCN RAT. In some configurations, status indicator B 330b may be structured as described above in connection with Table 5. First type message B 310b and second type message B 316b may be generated and/or sent to the first communication circuitry 304 as similarly described above.

Accordingly, the second communication circuitry 306 may perform one or more of the functions that are described in connection with the first communication circuitry 304 relative to the RAT(s) utilized by the second communication circuitry 306. For example, the second communication circuitry 306 may also generate and send one or more first type messages that identify one or more RATs. The second communication circuitry 306 may also generate and send one or more second type messages associated with first type messages. The second communication circuitry 306 may send messages to the first communication circuitry over the non-radio link 308. The first communication circuitry 304 may perform one or more operations to mitigate or avoid interference (with the second communication circuitry 306) as described in connection with the second communication circuitry 306.

In some configurations, an interpretation utilized by the first communication circuitry 304 for RAT identifier B 314b may be the same as the interpretation utilized by the second communication circuitry 306 for RAT identifier A 314a. For example, a unified interpretation utilized by both the first communication circuitry 304 and the second communication circuitry 306 may include mappings for RATs utilized by both. Accordingly, one or more bit patterns in this interpretation may indicate RAT(s) utilized by the first communication circuitry 304 while one or more bit patterns in the same interpretation may indicate other RAT(s) utilized by the second communication circuitry 306. For instance, the same bit pattern utilized in RAT identifier A 314a and RAT identifier B 314b would be interpreted as the same RAT by both the first communication circuitry 304 and the second communication circuitry 306. This approach may be beneficial for its simplicity and for error checking purposes. For example, if the second communication circuitry 306 receives RAT identifier A 314a with a bit pattern indicating a RAT that is not utilized by the first communication circuitry 304 (e.g., indicating a RAT that is utilized by the second communication circuitry 306), then the second communication circuitry 306 may detect an error and may request that the first communication circuitry 304 resend RAT identifier A 314a. This may help to reduce errors, particularly if a scheme such as a Gray code is utilized, where RATs corresponding to one communication circuitry may differ by multiple bits. For example, LTE may be identified as '0000,' GSM may be identified as '0011,' IEEE 802.11 may be identified as '0010' and Bluetooth may be identified as '0001'.

In other configurations, the first communication circuitry 304 and the second communication circuitry 306 may utilize different interpretations. For example, the first communication circuitry 304 may interpret '0000' in RAT identifier B 314b as Bluetooth, while the second communication circuitry 306 may interpret '0000' in RAT identifier A 314a as LTE. This approach may be beneficial for capacity. In particular, this may allow each of the first communication circuitry 304 and the second communication circuitry 306 to identify $2^n$ RATs, where n is the number of bits allocated for the RAT identifier (e.g., RAT identifier A 314a and RAT identifier B 314b). In this approach, error detection (and/or resend requesting) may also be performed if not all of the $2^n$ values identify a RAT. For example, receiving an unassigned value may indicate an error, in which case a resend may be requested. A scheme such as Gray code may optionally be used.

Figure 4:
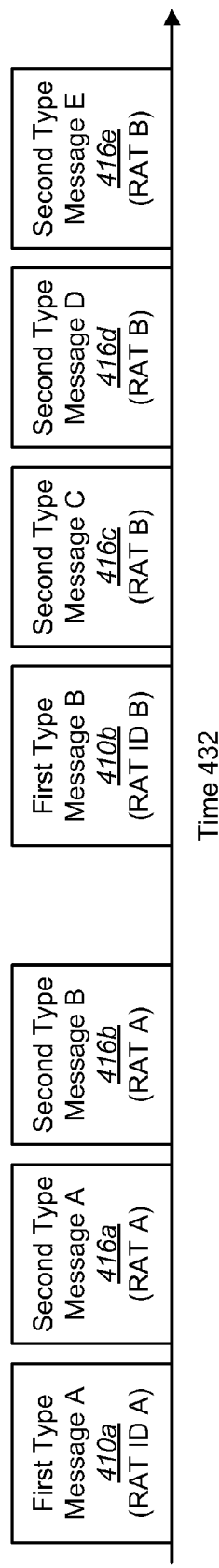
FIG. 4 is a diagram illustrating an example of a first approach to identifying a RAT in accordance with the systems and methods described herein.

FIG. 4 is a diagram illustrating an example of a first approach to identifying a RAT in accordance with the systems and methods described herein. In particular, FIG. 4 illustrates an example of first type messages A-B 410a-b and second type messages A-E 416a-e over time 432. In the first approach, one or more second type messages 416 may be sent after the associated first type message 410. For example, second type messages A-B 416a-b may be sent after associated first type message A 410a and second type messages C-E 416c-e may be sent after associated first type message B 410b. For instance, second type messages A-B 416a-b may indicate statuses corresponding to RAT A, which is identified by first type message A 410a. Similarly, second type messages C-E 416c-e may indicate statuses corresponding to RAT B, which is identified by first type message B 410b.

Figure 5:
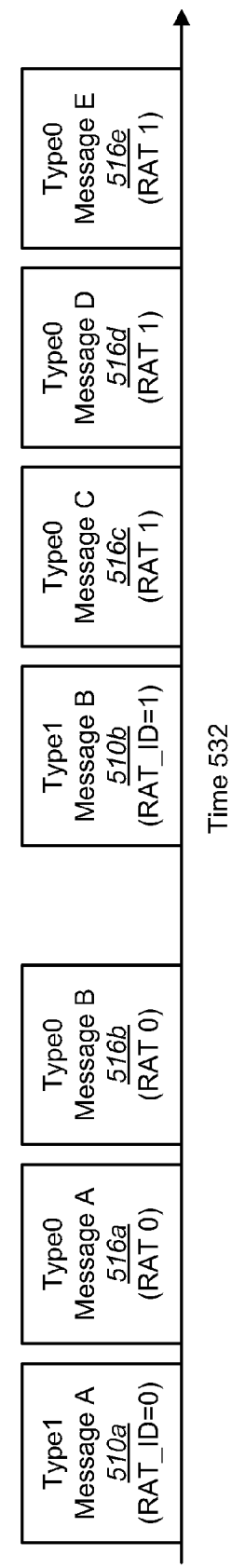
FIG. 5 is a diagram illustrating a more specific example of a first approach to identifying a RAT in accordance with the systems and methods described herein.

FIG. 5 is a diagram illustrating a more specific example of a first approach to identifying a RAT in accordance with the systems and methods described herein. In particular, FIG. 5 illustrates an example of type1 messages A-B 510a-b and type0 messages A-E 516a-e over time 532. For example, type0 messages A-B 516a-b may be sent after associated type1 message A 510a and type0 messages C-E 516c-e may be sent after associated type1 message B 510b. For instance, type0 messages A-B 516a-b may indicate statuses corresponding to RAT 0, which is identified by type1 message A 510a (with a RAT identifier RAT_ID=0, for example). Similarly, type0 messages C-E 516c-e may indicate statuses corresponding to RAT 1, which is identified by type1 message B 510b (with a RAT identifier RAT_ID=1, for example).

As described above, for a type0 message, there may be a need for a RAT identifier to indicate the source of the RAT and/or carrier that has a transmit or receive (TX/RX) state change triggering a corresponding type0 message. In this first approach, other message types (e.g., type1 messages) may be used to indicate the trigger source of the type0 messages. For example, a type1 message may be used (with MSG[0] masked) to indicate the source of one or more upcoming type0 messages. In this example, the type1 message may have MSG[0] "(RE)SEND_REAL_TIME" cleared. The type1 message may use MSG[1]-MSG[4] to indicate a source RAT identifier (ID) that is triggering the upcoming type0 message(s). For each type0 message, the most recent type1 message indicates the RAT ID. Each time a type1 message is received with the "(RE)SEND_REAL_TIME" bit set, the receiver may respond with a type1 message as RAT identifier followed by a type0 message for all the RATs that are currently active. Other message types (such as type7) may be additionally or alternatively used for the purpose of identifying a RAT.

FIG. 6 is a diagram illustrating an example of a second approach to identifying a RAT in accordance with the systems and methods described herein. In particular, FIG. 6 illustrates an example of first type messages A-D 610*a-d* and second type messages A-D 616*a-d* over time 632. In the second approach, a first type message with a RAT identifier may be appended at the end of each second type message (or at the end of a series of second type messages). For example, each second type message may be followed by a first type message that identifies a RAT corresponding to the second type message. As illustrated in FIG. 6, first type message A 610*a* (that identifies RAT A) may follow second type message A 616*a* (that indicates a status for RAT A). Similarly, first type message B 610*b* (that identifies RAT B) may follow second type message B 616*b* (that indicates a status for RAT B). As illustrated in the example in FIG. 6, another status for RAT A may then be indicated by second type message C 616*c*, which is followed by first type message C 610*c*, which identifies RAT A. Similarly, another status for RAT B may then be indicated by second type message D 616*d*, which is followed by first type message D 610*d*, which identifies RAT B.

FIG. 7 is a diagram illustrating a more specific example of a second approach to identifying a RAT in accordance with the systems and methods described herein. In particular, FIG. 7 illustrates an example of type1 messages A-D 710*a-d* and type0 messages A-D 716*a-d* over time 732. As illustrated in FIG. 7, type1 message A 710*a* (that identifies RAT 0 with a RAT identifier RAT_ID=0, for instance) may follow type0 message A 716*a* (that indicates a status for RAT 0). Similarly, type1 message B 710*b* (that identifies RAT 1 with a RAT identifier RAT_ID=1, for instance) may follow type0 message B 716*b* (that indicates a status for RAT 1). Furthermore, another status for RAT 0 may then be indicated by type0 message C 716*c*, which is followed by type1 message C 710*c*, which identifies RAT 0. Similarly, another status for RAT 1 may then be indicated by type0 message D 716*d*, which is followed by type1 message D 710*d*, which identifies RAT 1.

FIG. 8 is a diagram illustrating an example of a third approach to identifying a RAT in accordance with the systems and methods described herein. In particular, FIG. 8 illustrates an example of second type messages A-D 816*a-d* and first type messages A-D 810*a-d* over time 832. In the third approach, a second type message may follow (e.g., be appended at the end of) each first type message that includes a RAT identifier. For example, each first type message that indicates a status for a RAT may be followed by a second type message corresponding to the first type message. As illustrated in FIG. 8, second type message A 816*a* (that indicates a status for RAT A) may follow first type message A 810*a* (that identifies RAT A). Similarly, second type message B 816*b* (that indicates a status for RAT A) may follow first type message B 810*b* (that identifies RAT A). As illustrated in the example in FIG. 8, first type message C 810*c* may identify RAT B, a status for which may then be indicated by second type message C 816*c*. Similarly, first type message D 810*d* may again identify RAT B, a status for which may then be indicated by second type message D 816*d*.

In some configurations of the third approach, a first type message 810 that identifies a RAT is sent before each second type message 816. In this approach, if the first type message 810 is corrupted or lost, then the receiving communication circuitry may drop the corresponding second type message 816 and/or may send a first type message to request a resend. For instance, the receiving communication circuitry may send a first type message that does not identify a RAT and that is not masked (e.g., that has the "(RE)SEND_REAL_TIME" bit set) to request a resend. The other communication circuitry that initially transmitted the corrupted or lost first type message 810 may resend the first type message 810 followed by a second type message 816 for all the RATs that are currently active upon receiving the request to resend.

FIG. 9 is a diagram illustrating a more specific example of a third approach to identifying a RAT in accordance with the systems and methods described herein. In particular, FIG. 9 illustrates an example of type0 messages A-D 916*a-d* and type1 messages A-D 910*a-d* over time 932. As illustrated in FIG. 9, type0 message A 916*a* (that indicates a status for RAT 0) may follow type1 message A 910*a* (that identifies RAT 0 with RAT_ID=0, for example). Similarly, type0 message B 916*b* (that indicates a status for RAT 0) may follow type1 message B 910*b* (that identifies RAT 0). As illustrated in the example in FIG. 9, type1 message C 910*c* may identify RAT 1 (with RAT_ID=1, for example), a status for which may then be indicated by type0 message C 916*c*. Similarly, type1 message D 910*d* may again identify RAT 1, a status for which may then be indicated by type0 message D 916*d*.

In some configurations as described above, if the type1 message 910 is corrupted or lost, then the receiving communication circuitry may drop the corresponding type0 message 916 and/or may send a type1 message to request a resend. For instance, the receiving communication circuitry may send a type1 message that does not identify a RAT and that is not masked (e.g., that has the "(RE)SEND_REAL_TIME" bit set) to request a resend. The other communication circuitry that initially transmitted the corrupted or lost type1 message 910 may resend the type1 message 910 followed by a type0 message 916 for all the RATs that are currently active upon receiving the request to resend.

Figure 10:
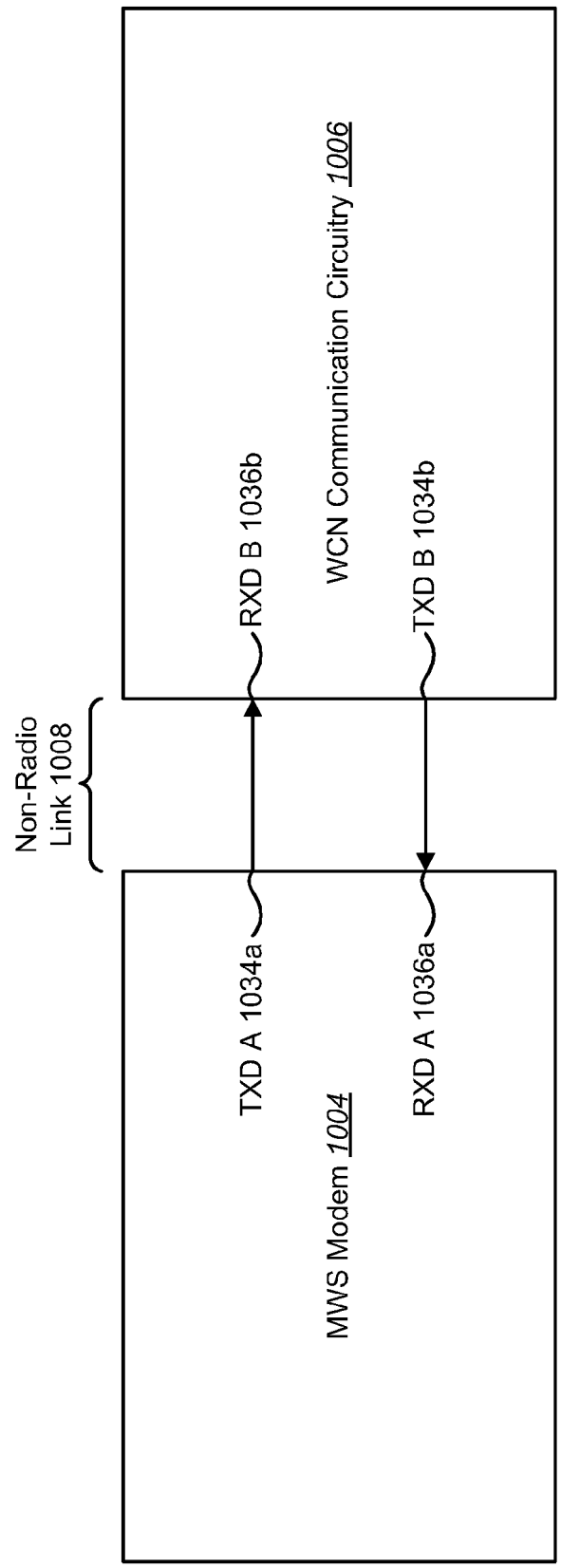
FIG. 10 is a block diagram illustrating more specific examples of communication circuitry.

FIG. 10 is a block diagram illustrating more specific examples of communication circuitry. In particular, FIG. 10 illustrates an MWS modem 1004 and WCN communication circuitry 1006. The MWS modem 1004 may be one example of the first communication circuitry 104 described in connection with FIG. 1. The WCN communication circuitry 1006 may be one example of the second communication circuitry 106 described in connection with FIG. 1. The WCN communication circuitry 1006 may provide functionality in accordance with BT and IEEE 802.11 standards. As described above in connection with FIG. 1, the MWS modem 1004 may perform one or more of modulation, demodulation, encoding, decoding, scheduling, filtering, precoding, network scanning, network selection, control functions (e.g., requesting resource allocation, hybrid automatic repeat request (HARQ), authentication, etc.), scrambling, descrambling, etc., in accordance with one or more MWS RATs. Additionally or alternatively, the WCN communication circuitry 1006 may perform one or more of modulation, demodulation, encoding, decoding, scheduling, filtering, precoding, network scanning, network selection, control functions (e.g., requesting resource allocation, hybrid automatic repeat request (HARQ), authentication, etc.), scrambling, descrambling, etc., in accordance with BT and IEEE 802.11 RATs.

As illustrated in FIG. 10, the MWS modem 1004 and the WCN communication circuitry 1006 may communicate with each other over a non-radio link 1008. In this example, the non-radio link 1008 may be implemented with a two-wire interface between the MWS modem 1004 and the WCN communication circuitry 1006. For example, the non-radio link 1008 may provide full duplex communication between the MWS modem 1004 and the WCN communication circuitry 1006.

The MWS modem 1004 may provide digital transmit signal A (TXD A) 1034a to the WCN communication circuitry 1006. TXD A 1034a may include one or more first type messages (e.g., type1 messages and/or type7 messages) and one or more second type messages (e.g., type0 messages and/or type2 messages) as described above. The WCN communication circuitry 1006 may receive TXD A 1034a as digital receive signal B (RXD B) 1036b.

The WCN communication circuitry 1006 may provide digital transmit signal B (TXD B) 1034b to the MWS modem 1004. TXD B 1034b may include one or more first type messages (e.g., type1 messages and/or type7 messages) and one or more second type messages (e.g., type0 messages and/or type2 messages) as described above. The WCN communication circuitry 1006 may receive TXD B 1034b as digital receive signal A (RXD A) 1036a.

Figure 11:
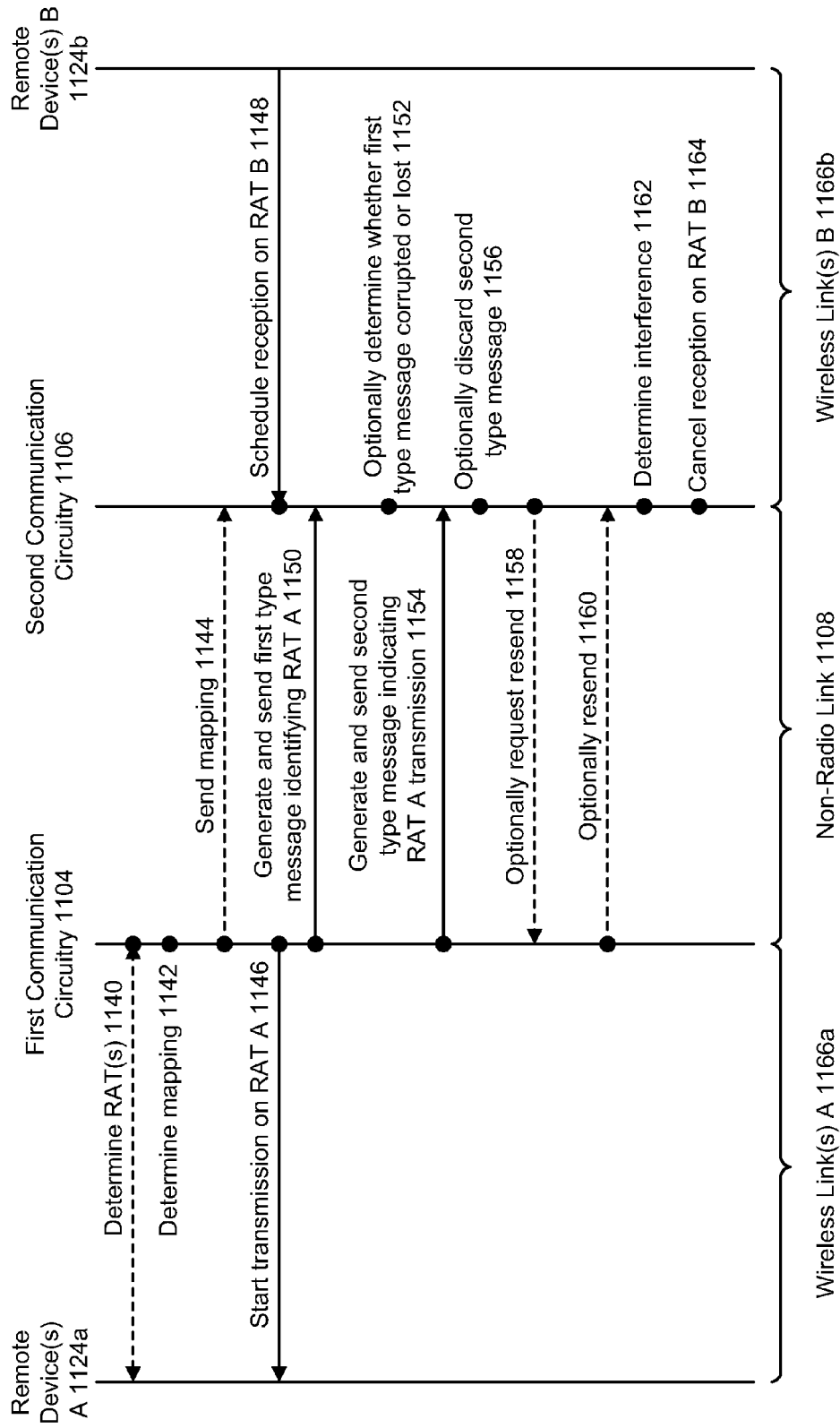
FIG. 11 is a thread diagram illustrating an example of identifying a RAT.

FIG. 11 is a thread diagram illustrating an example of identifying a RAT. In particular, FIG. 11 illustrates a first communication circuitry 1104 and a second communication circuitry 1106. The first communication circuitry 1104 and the second communication circuitry 1106 may communicate via a non-radio link 1108 as described above. The first communication circuitry 1104 may be an example of one or more of the first communication circuitries 104, 304 described in connection with one or more of FIGS. 1-3 and/or an example of the MWS modem 1004 described in connection with FIG. 10. The second communication circuitry 1106 may be an example of one or more of the second communication circuitry 106, 306 described in connection with one or more of FIGS. 1-3 and/or an example of the WCN communication circuitry 1006 described in connection with FIG. 10. FIG. 11 further illustrates one or more remote devices A 1124a and one or more remote devices B 1124b. Remote devices A 1124a and/or remote devices B 1124b may be examples of one or more of the remote devices 324a-d described in connection with FIG. 3. Remote devices A 1124a and/or remote devices B 1124b may provide wireless (e.g., radio frequency (RF)) communication in accordance with one or more RATs.

As illustrated in FIG. 11, remote device(s) A 1124a may communicate with the first communication circuitry 1104 via one or more wireless links A 1166a. It should be noted that wireless link(s) A 1166a may be implemented on one or more bands, carriers and/or subscriptions (e.g., with inter-band carrier aggregation, intra-band carrier aggregation and/or DSDA, etc.). Additionally or alternatively, remote device(s) B 1124b may communicate with the second communication circuitry 1106 via one or more wireless links B 1166b. It should be noted that wireless link(s) B 1166b may be implemented on one or more bands, carriers and/or subscriptions (e.g., with DBS, tri-band simultaneous, etc.). It should be noted that one or more of the procedures or functions described in connection with FIG. 11 may be implemented in combination with one or more of the electronic device(s) 102, 302 described in connection with one or more of FIGS. 1 and 3, in combination with the method 200 described in connection with FIG. 2 and/or in combination with the MWS modem 1004 and/or WCN communication circuitry 1006 described in connection with FIG. 10.

As illustrated in FIG. 11, the first communication circuitry 1104 may optionally determine 1140 one or more RATs. For example, the first communication circuitry 1104 may optionally determine 1140 one or more RATs that may provide communication with the first communication circuitry 1104. In some configurations, the first communication circuitry 1104 may perform a network search to determine 1140 one or more RATs corresponding to one or more remote devices A 1124a. For instance, the first communication circuitry 1104 may receive one or more broadcast signals and/or beacons that indicate potential networks (e.g., LTE networks, GSM networks, CDMA networks, Wi-MAX networks, etc.) for service.

In some configurations, determining 1140 one or more RATs may include determining one or more bands and/or carriers corresponding to each RAT. For example, the first communication circuitry 1104 may additionally determine 1140 one or more bands and/or carriers available for wireless communication with remote device(s) A 1124a. For example, the first communication circuitry 1104 may maintain a list of potential bands and/or carriers provided by a particular service provider corresponding to remote device(s) A 1124a. Additionally or alternatively, performing a network search may indicate one or more potential bands and/or carriers for communication with remote device(s) A 1124a.

The first communication circuitry 1104 may optionally determine 1142 a mapping. For example, the first communication circuitry 1104 may allocate a bit pattern (e.g., RAT identifier) for each RAT (with or without each potential band and/or carrier). In some configurations, the first communication circuitry 1104 may allocate each RAT to bit patterns in ascending or descending order. In other configurations, the first communication circuitry 1104 may allocate each RAT to a bit pattern in accordance with a Gray code or some other allocation pattern (e.g., allocate every-other bit pattern in ascending order, etc.). Determining 1142 the mapping may be accomplished in accordance with the interpretations and/or mappings described above in connection with FIGS. 1 and/or 3.

The first communication circuitry 1104 may optionally send 1144 the mapping. For example, the first communication circuitry 1104 may send one or more messages that indicate the mapping or interpretation to the second communication circuitry 1106. In some configurations, the first communication circuitry 1104 may utilize one or more type2 messages (e.g., transparent data messages) to represent the mapping. In other configurations, one or more other types of messages may be utilized.

In some configurations, sending 1144 the mapping may include sending a first type message (e.g., a type1 or type7 message) with the bit pattern (e.g., a proposed RAT identifier) and sending a second type message (e.g., a type2 message or other type of message) that indicates the mapping or interpretation of the bit pattern (e.g., proposed RAT identifier). This first type message and/or second type message may be utilized to send 1144 the mapping in accordance with one or more of the approaches (e.g., sequences) described above.

In some configurations, the RAT(s) and/or mapping may be predetermined. For example, the first communication circuitry 1104 and/or the second communication circuitry 1106 may have a default mapping that may be utilized. The first communication circuitry 1104 and/or the second communication circuitry 1106 may always utilize the default mapping or may update the mapping using one or more of the foregoing procedures for determining 1140 RAT(s), determining 1142 a mapping and/or sending 1144 the mapping.

In this example, the first communication circuitry 1104 may start 1146 a transmission on RAT A. For instance, the first communication circuitry 1104 may initiate an uplink transmission to remote device(s) A 1124*a* in accordance with one or more RATs on wireless link(s) A 1166*a*. Continuing the example, the second communication circuitry 1106 may schedule 1148 reception on RAT B. For example, remote device B 1124*b* may send an indicator to the second communication circuitry 1106 indicating that remote device B 1124*b* has pending downlink data for reception by the second communication circuitry 1106 on RAT B over wireless link(s) B 1166*b*.

The first communication circuitry 1104 may generate and send 1150 a first type message (e.g., type1 message) identifying RAT A. This may be accomplished as described above in connection with one or more of FIGS. 1-10. For example, the first type message may include a RAT identifier that identifies a particular RAT (with our without a particular band and/or carrier).

The second communication circuitry 1106 may optionally determine 1152 whether the first type message is corrupted or lost. For example, the second communication circuitry 1106 may perform error detection on the first type message. In some configurations, the second communication circuitry 1106 may determine whether the RAT identifier indicates a RAT that is not used by the first communication circuitry or indicates an unassigned value as described above.

The first communication circuitry 1104 may generate and send 1154 a second type message indicating the RAT A transmission. This may be accomplished as described above in connection with one or more of FIGS. 1-10.

In configurations where the second communication circuitry 1106 determines 1152 whether the first type message is corrupted or lost, the second communication circuitry 1106 may optionally discard 1156 the second type message. For example, if the second communication circuitry 1106 determines 1152 that the first type message is corrupted or lost, the second communication circuitry 1106 may discard 1156 one or more corresponding second type messages. This may be because the RAT corresponding to the second communication circuitry 1106 may not be conclusively identified.

In the case whether the first type message is corrupted or lost, the second communication circuitry 1106 may optionally request 1158 a resend. For example, the second communication circuitry 1106 may send a type1 message with a resend bit set as described above.

In the case that the first communication circuitry 1104 receives the resend request, the first communication circuitry 1104 may optionally resend 1160 at least the corrupted or missing first type message. Additionally or alternatively, the first communication circuitry 1104 may send the identification and status of all RATs currently in use by the first communication circuitry 1104. It should be noted that one or more of steps 1150, 1152, 1154, 1156, 1158 and/or 1160 may be performed in different orders.

The second communication circuitry 1106 may determine 1162 interference. For example, the second communication circuitry 1106 may determine whether any of the RAT(s) in use (according to transmit and/or receive status) by the first communication circuitry 1104 may conflict or cause interference with any of the RAT(s) in use by the second communication circuitry 1106. As described above, the second communication circuitry 1106 may determine whether any of the identified RAT(s) are utilizing one or more bands, carriers and/or time frames to transmit and/or receive that overlap with the RAT(s) in use (or in anticipated use) by the second communication circuitry 1106.

In this example, assume that RAT A, as identified by the first type message, is transmitting in a band that overlaps the scheduled reception frequency for RAT B. In this example, the second communication circuitry 1106 may cancel 1164 reception on RAT B. In other scenarios, the second communication circuitry 1106 may send a first type message identifying RAT B with a corresponding status in order to request that the first communication circuitry 1104 pause or discontinue the transmission on RAT A. This may enable the second communication circuitry 1106 to receive the communication on RAT B. Other operations for mitigating interference, as described above, may be additionally or alternatively utilized.

Figure 12:
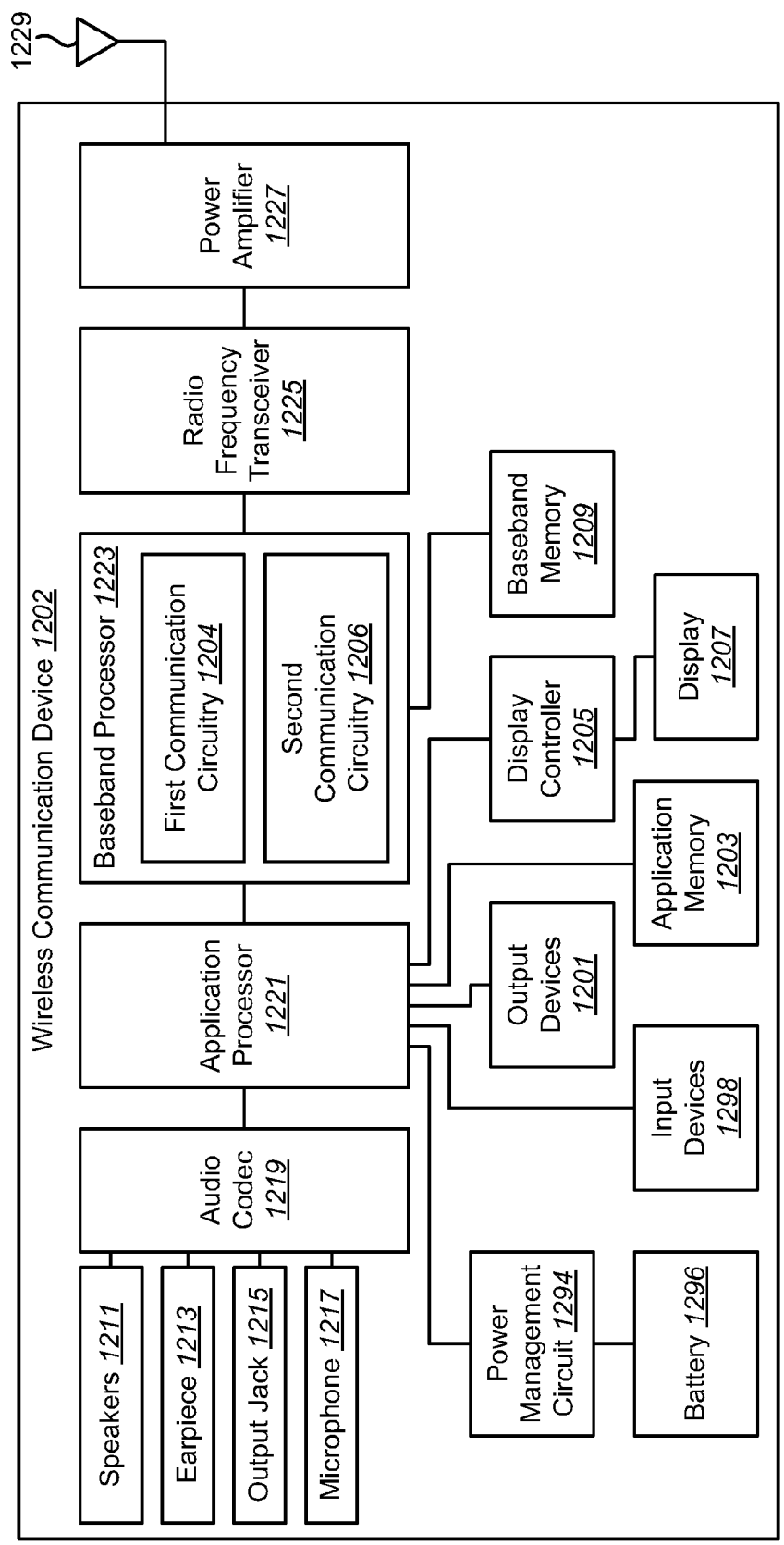
FIG. 12 is a block diagram illustrating one configuration of a wireless communication device in which systems and methods for identifying a RAT may be implemented.

FIG. 12 is a block diagram illustrating one configuration of a wireless communication device 1202 in which systems and methods for identifying a RAT may be implemented. The wireless communication device 1202 illustrated in FIG. 12 may be an example of one or more of the electronic devices 102, 302 described herein. The wireless communication device 1202 may include an application processor 1221. The application processor 1221 generally processes instructions (e.g., runs programs) to perform functions on the wireless communication device 1202. The application processor 1221 may be coupled to an audio coder/decoder (codec) 1219.

The audio codec 1219 may be used for coding and/or decoding audio signals. The audio codec 1219 may be coupled to at least one speaker 1211, an earpiece 1213, an output jack 1215 and/or at least one microphone 1217. The speakers 1211 may include one or more electro-acoustic transducers that convert electrical or electronic signals into acoustic signals. For example, the speakers 1211 may be used to play music or output a speakerphone conversation, etc. The earpiece 1213 may be another speaker or electro-acoustic transducer that can be used to output acoustic signals (e.g., speech signals) to a user. For example, the earpiece 1213 may be used such that only a user may reliably hear the acoustic signal. The output jack 1215 may be used for coupling other devices to the wireless communication device 1202 for outputting audio, such as headphones. The speakers 1211, earpiece 1213 and/or output jack 1215 may generally be used for outputting an audio signal from the audio codec 1219. The at least one microphone 1217 may be an acousto-electric transducer that converts an acoustic signal (such as a user's voice) into electrical or electronic signals that are provided to the audio codec 1219.

The application processor 1221 may also be coupled to a power management circuit 1294. One example of a power management circuit 1294 is a power management integrated circuit (PMIC), which may be used to manage the electrical power consumption of the wireless communication device 1202. The power management circuit 1294 may be coupled to a battery 1296. The battery 1296 may generally provide electrical power to the wireless communication device 1202. For example, the battery 1296 and/or the power management circuit 1294 may be coupled to at least one of the elements included in the wireless communication device 1202.

The application processor 1221 may be coupled to at least one input device 1298 for receiving input. Examples of input devices 1298 include infrared sensors, image sensors, accelerometers, touch sensors, keypads, etc. The input devices 1298 may allow user interaction with the wireless communication device 1202. The application processor 1221 may also be coupled to one or more output devices 1201. Examples of output devices 1201 include printers, projectors, screens, haptic devices, etc. The output devices 1201 may allow the wireless communication device 1202 to produce output that may be experienced by a user.

The application processor 1221 may be coupled to application memory 1203. The application memory 1203 may be any electronic device that is capable of storing electronic information. Examples of application memory 1203 include double data rate synchronous dynamic random access memory (DDRAM), synchronous dynamic random access memory (SDRAM), flash memory, etc. The application memory 1203 may provide storage for the application processor 1221. For instance, the application memory 1203 may store data and/or instructions for the functioning of programs that are run on the application processor 1221.

The application processor 1221 may be coupled to a display controller 1205, which in turn may be coupled to a display 1207. The display controller 1205 may be a hardware block that is used to generate images on the display 1207. For example, the display controller 1205 may translate instructions and/or data from the application processor 1221 into images that can be presented on the display 1207. Examples of the display 1207 include liquid crystal display (LCD) panels, light emitting diode (LED) panels, cathode ray tube (CRT) displays, plasma displays, etc.

The application processor 1221 may be coupled to a baseband processor 1223. The baseband processor 1223 generally processes communication signals. For example, the baseband processor 1223 may demodulate and/or decode received signals. Additionally or alternatively, the baseband processor 1223 may encode and/or modulate signals in preparation for transmission.

In some configurations, the baseband processor 1223 may include a first communication circuitry 1204 and/or a second communication circuitry 1206. The first communication circuitry 1204 may be an example of one or more of the first communication circuitries 104, 304, 1104 described in connection with one or more of FIGS. 1-3 and 11 and/or an example of the MWS modem 1004 described in connection with FIG. 10. The second communication circuitry 1206 may be an example of one or more of the second communication circuitry 106, 306, 1106 described in connection with one or more of FIGS. 1-3 and 11 and/or an example of the WCN communication circuitry 1006 described in connection with FIG. 10. The first communication circuitry 1204 and/or second communication circuitry 1206 may perform one or more of the functions and/or procedures described in connection with one or more of FIGS. 1-11. In some configurations, the wireless communication device 1202 may include multiple baseband processors 1223, where one baseband processor 1223 comprises the first communication circuitry 1204 and another baseband processor 1223 comprises the second communication circuitry 1206.

The baseband processor 1223 may be coupled to baseband memory 1209. The baseband memory 1209 may be any electronic device capable of storing electronic information, such as SDRAM, DDRAM, flash memory, etc. The baseband processor 1223 may read information (e.g., instructions and/or data) from and/or write information to the baseband memory 1209. Additionally or alternatively, the baseband processor 1223 may use instructions and/or data stored in the baseband memory 1209 to perform communication operations.

The baseband processor 1223 may be coupled to a radio frequency (RF) transceiver 1225. The RF transceiver 1225 may be coupled to a power amplifier 1227 and one or more antennas 1229. The RF transceiver 1225 may transmit and/or receive radio frequency signals. For example, the RF transceiver 1225 may transmit an RF signal using a power amplifier 1227 and at least one antenna 1229. The RF transceiver 1225 may also receive RF signals using the one or more antennas 1229.

Figure 13:
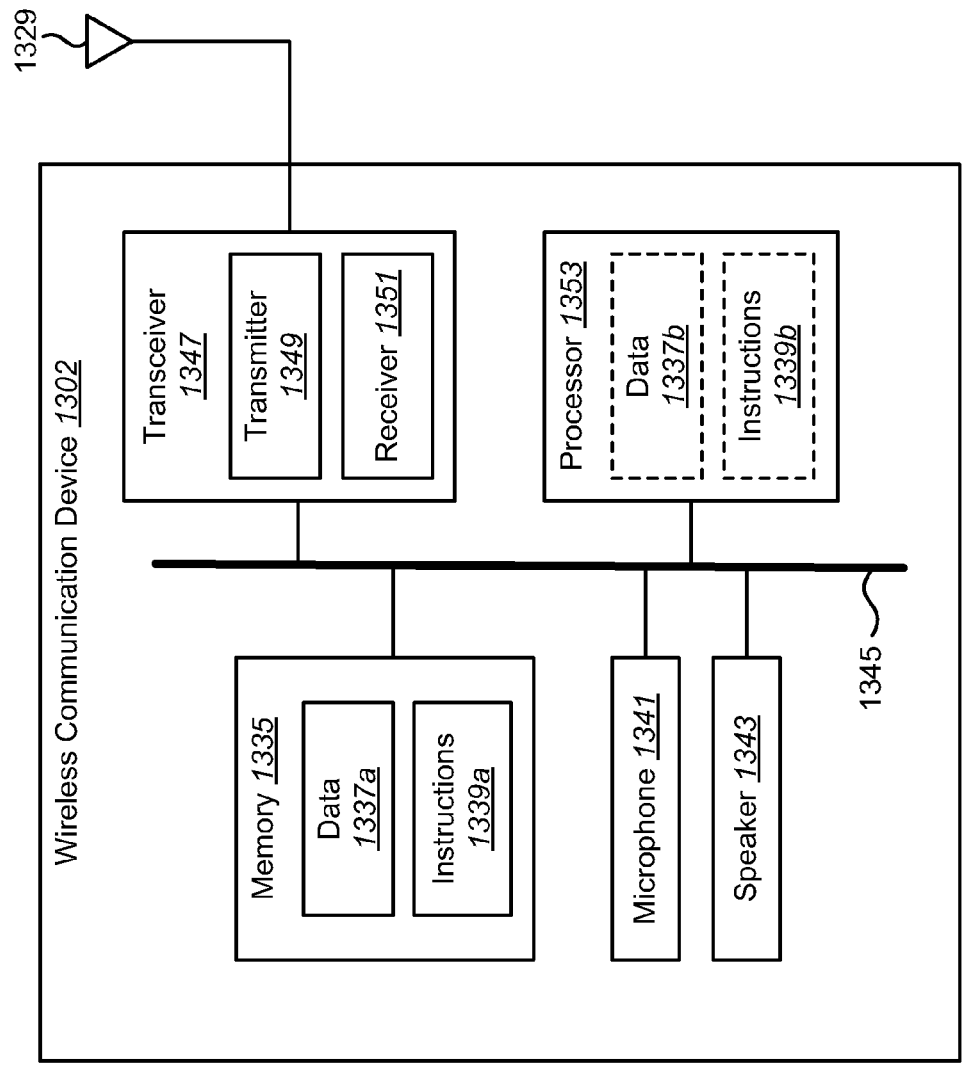
FIG. 13 illustrates certain components that may be included within a wireless communication device.

FIG. 13 illustrates certain components that may be included within a wireless communication device 1302. The wireless communication device 1302 described in connection with FIG. 13 may be implemented in accordance with one or more of the electronic devices 102, 302, wireless communication device 1202, first communication circuitries 104, 304, 1104, 1204, second communication circuitries 106, 306, 1106, 1206, MWS modem 1004, WCN communication circuitry 1006 and/or the method 200 described above.

The wireless communication device 1302 includes a processor 1353. The processor 1353 may be a general purpose single- or multi-chip microprocessor (e.g., an ARM), a special purpose microprocessor (e.g., a digital signal processor (DSP)), a microcontroller, a programmable gate array, etc. The processor 1353 may be referred to as a central processing unit (CPU). Although just a single processor 1353 is shown in the wireless communication device 1302 of FIG. 13, in an alternative configuration, a combination of processors 1353 (e.g., an ARM and DSP) could be used.

The wireless communication device 1302 also includes memory 1335 in electronic communication with the processor 1353 (e.g., the processor 1353 can read information from and/or write information to the memory 1335). The memory 1335 may be any electronic component capable of storing electronic information. The memory 1335 may be random access memory (RAM), read-only memory (ROM), magnetic disk storage media, optical storage media, flash memory devices in RAM, on-board memory included with the processor 1353, programmable read-only memory (PROM), erasable programmable read-only memory (EPROM), electrically erasable PROM (EEPROM), registers and so forth, including combinations thereof.

Data 1337*a* and instructions 1339*a* may be stored in the memory 1335. The instructions 1339*a* may include one or more programs, routines, sub-routines, functions, procedures, code, etc. The instructions 1339*a* may include a single computer-readable statement or many computer-readable statements. The instructions 1339*a* may be executable by the processor 1353 to implement one or more of the methods 200 or functions described herein. Executing the instructions 1339*a* may involve the use of the data 1337*a* that is stored in the memory 1335. FIG. 13 shows some instructions 1339*b* and data 1337*b* being loaded into the processor 1353 (which may come from instructions 1339*a* and data 1337*a* in memory 1335).

The wireless communication device 1302 may also include a transmitter 1349 and a receiver 1351 to allow transmission and reception of signals between the wireless communication device 1302 and a remote location (e.g., a remote device, an electronic device, a wireless communication device, etc.). The transmitter 1349 and receiver 1351 may be collectively referred to as a transceiver 1347. An antenna 1329 may be electrically coupled to the transceiver 1347. The wireless communication device 1302 may also include (not shown) multiple transmitters 1349, multiple receivers 1351, multiple transceivers 1347 and/or multiple antenna 1329.

In some configurations, the wireless communication device 1302 may include one or more microphones 1341 for capturing acoustic signals. In one configuration, a microphone 1341 may be a transducer that converts acoustic signals (e.g., voice, speech, noise, etc.) into electrical or electronic signals. Additionally or alternatively, the wireless communication device 1302 may include one or more speakers 1343. The speaker 1343 may be a transducer that converts electrical or electronic signals into acoustic signals.

The various components of the wireless communication device 1302 may be coupled together by one or more buses, which may include a power bus, a control signal bus, a status signal bus, a data bus, etc. For simplicity, the various buses are illustrated in FIG. 13 as a bus system 1345.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for identifying a radio access technology by an electronic device, comprising:
   generating, by a first communication circuitry, a first message that identifies a radio access technology of the first communication circuitry, wherein the first message is of a first message type;
   sending, by the first communication circuitry, the first message to a second communication circuitry, wherein the first communication circuitry and the second communication circuitry communicate with each other over a non-radio link; and
   sending, by the first communication circuitry, a second message associated with the first message, wherein the second message is of a second message type that is different from the first message type.

2. The method of claim 1, wherein the second message is sent after the first message.

3. The method of claim 2, further comprising sending at least one additional message associated with the first message, wherein the at least one additional message is of a type that is different from the first message type.

4. The method of claim 1, further comprising sending at least one additional message of the first message type, wherein each of the first message and the at least one additional message identify separate radio access technologies.

5. The method of claim 1, wherein the first message type is masked to avoid indicating send or resend of a real-time message.

6. The method of claim 1, wherein the first communication circuitry is utilized for mobile wireless system communications and the second communication circuitry is utilized for wireless connectivity communications.

7. The method of claim 1, wherein at least one of the first communication circuitry and the second communication circuitry is concurrently communicating on at least one of multiple carriers and multiple radio access technologies.

8. The method of claim 1, wherein the second communication circuitry performs an operation to mitigate interference.

9. The method of claim 1, wherein the first message is sent after the second message.

10. The method of claim 1, wherein if the first message is corrupted or lost, the first communication circuitry receives a resend indicator.

11. The method of claim 1, wherein the first communication circuitry and the second communication circuitry are electrically coupled.

12. An electronic device for identifying a radio access technology, comprising:
a first communication circuitry; and
a second communication circuitry coupled to the first communication circuitry, wherein the first communication circuitry and the second communication circuitry communicate with each other over a non-radio link, wherein the first communication circuitry generates a first message that identifies a radio access technology of the first communication circuitry, sends the first message to the second communication circuitry, and sends a second message associated with the first message, wherein the first message is of a first message type and the second message is of a second message type that is different from the first message type.

13. The electronic device of claim 12, wherein the second message is sent after the first message.

14. The electronic device of claim 13, wherein the first communication circuitry sends at least one additional message associated with the first message, wherein the at least one additional message is of a type that is different from the first message type.

15. The electronic device of claim 12, wherein the first communication circuitry sends at least one additional message of the first message type, wherein each of the first message and the at least one additional message identify separate radio access technologies.

16. The electronic device of claim 12, wherein the first message type is masked to avoid indicating send or resend of a real-time message.

17. The electronic device of claim 12, wherein the first communication circuitry is utilized for mobile wireless system communications and the second communication circuitry is utilized for wireless connectivity communications.

18. The electronic device of claim 12, wherein at least one of the first communication circuitry and the second communication circuitry is concurrently communicating on at least one of multiple carriers and multiple radio access technologies.

19. The electronic device of claim 12, wherein the second communication circuitry performs an operation to mitigate interference.

20. The electronic device of claim 12, wherein the first message is sent after the second message.

21. The electronic device of claim 12, wherein if the first message is corrupted or lost, the first communication circuitry receives a resend indicator.

22. The electronic device of claim 12, wherein the first communication circuitry and the second communication circuitry are electrically coupled.

23. An apparatus for identifying a radio access technology, comprising:
a first communication means for generating a first message that identifies a radio access technology of the first communication means, for sending the first message to a second communication means, and for sending a second message associated with the first message, wherein the first message is of a first message type and the second message is of a second message type that is different from the first message type, wherein the first communication means and the second communication means communicate with each other over a non-radio link.

24. The apparatus of claim 23, wherein the second message is sent after the first message.

25. The apparatus of claim 24, wherein the first communication means sends at least one additional message associated with the first message, wherein the at least one additional message is of a type that is different from the first message type.

26. The apparatus of claim 23, wherein the first message is sent after the second message.

27. A computer-program product for identifying a radio access technology, comprising a non-transitory tangible computer-readable medium having instructions thereon, the instructions comprising:
code for causing an electronic device to generate, by a first communication circuitry, a first message that identifies a radio access technology of the first communication circuitry, wherein the first message is of a first message type;
code for causing the electronic device to send, by the first communication circuitry, the first message to a second communication circuitry, wherein the first communication circuitry and the second communication circuitry communicate with each other over a non-radio link; and
code for causing the electronic device to send, by the first communication circuitry, a second message associated with the first message, wherein the second message is of a second message type that is different from the first message type.

28. The computer-program product of claim 27, wherein the second message is sent after the first message.

29. The computer-program product of claim 28, wherein the first communication circuitry sends at least one additional message associated with the first message, wherein the at least one additional message is of a type that is different from the first message type.

30. The computer-program product of claim 27, wherein the first message is sent after the second message.

* * * * *